US008937722B2

(12) United States Patent
Cotte et al.

(10) Patent No.: US 8,937,722 B2
(45) Date of Patent: Jan. 20, 2015

(54) COMPLEX INDEX REFRACTION TOMOGRAPHY WITH SUB λ/6-RESOLUTION

(75) Inventors: Yann Cotte, Lausanne (CH); Nicolas Pavillon, Lausanne (CH); Christian Depeursinge, Préverenges (CH)

(73) Assignee: Ecole Polytechnique Federale de Lausanne (EPFL), Lausanne (CH)

(*) Notice: Subject to any disclaimer, the term of this patent is extended or adjusted under 35 U.S.C. 154(b) by 18 days.

(21) Appl. No.: 13/637,928

(22) PCT Filed: Mar. 28, 2011

(86) PCT No.: PCT/IB2011/051306
§ 371 (c)(1),
(2), (4) Date: Nov. 8, 2012

(87) PCT Pub. No.: WO2011/121523
PCT Pub. Date: Oct. 6, 2011

(65) Prior Publication Data
US 2013/0057869 A1    Mar. 7, 2013

(30) Foreign Application Priority Data
Mar. 28, 2010    (WO) ................. PCT/IB2010/051345

(51) Int. Cl.
*G01B 9/021* (2006.01)
*G02B 21/00* (2006.01)
*G02B 21/36* (2006.01)

(52) U.S. Cl.
CPC .................................. *G02B 21/365* (2013.01)
USPC ......................................... 356/457; 359/370

(58) Field of Classification Search
USPC .......................... 356/457, 458; 359/370, 371
See application file for complete search history.

(56) References Cited

U.S. PATENT DOCUMENTS

| 5,753,913 | A  | * | 5/1998  | Coene et al. ............ 250/307 |
| 7,411,736 | B2 | * | 8/2008  | Tsukagoshi ............ 359/642 |
| 7,439,478 | B2 | * | 10/2008 | Cartlidge et al. ........ 250/208.1 |
| 8,804,126 | B2 | * | 8/2014  | Tearney et al. .......... 356/479 |

FOREIGN PATENT DOCUMENTS

| EP | 0 529 125    | 3/1993 |
| WO | WO 00/20929  | 4/2000 |

OTHER PUBLICATIONS

Seelamantula, C. S. et al. "Zero-order-free image reconstruction in digital holographic microscopy". IEEE International Symposium on Biomedical Imaging: From Nano to Macro, 2009, pp. 201-204.*
International Search Report for PCT/IB2011/051306, mailed Oct. 31, 2011.

(Continued)

*Primary Examiner* — Michael A Lyons
(74) *Attorney, Agent, or Firm* — Nixon & Vanderhye P.C.

(57) ABSTRACT

A method for imaging a microscopic object with improved resolution including the steps of measuring a complex wavefield scattered by the microscopic object with an instrument or microscope, the complex wavefield being represented by phase and amplitude or by real and imaginary parts; and computing an image of the microscopic object with a resolution better than given by the Abbe diffraction limit, including deconvolving the complex wavefield scattered by the microscopic object with a complex coherent transfer function (CTF) applied to the complex wavefield.

15 Claims, 27 Drawing Sheets

(56) References Cited

OTHER PUBLICATIONS

Figure 1:
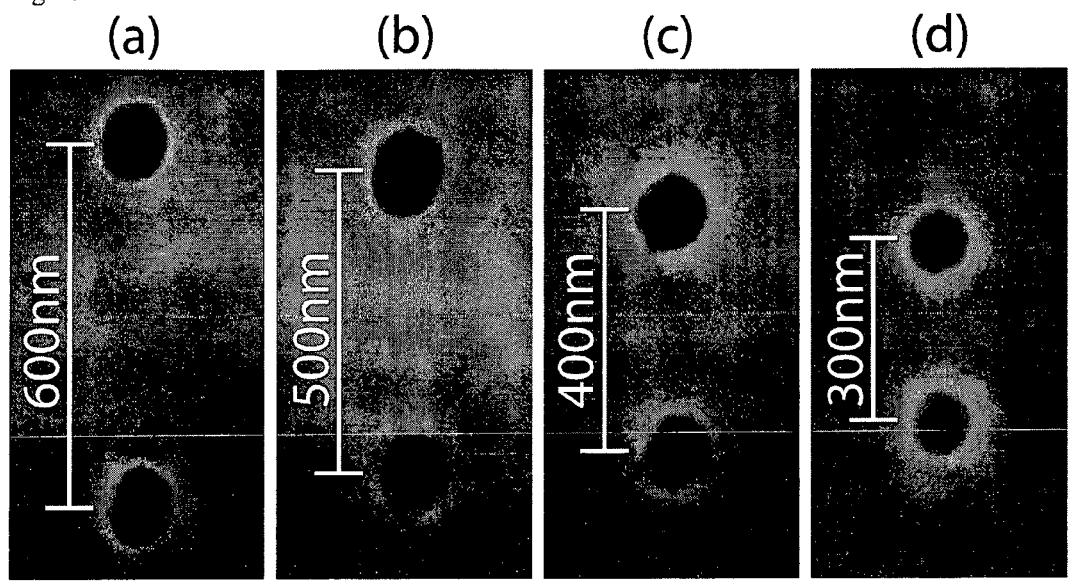

Written Opinion of the International Searching Authority for PCT/IB2011/051306, mailed Oct. 31, 2011.
Choi, W., et al, *Nature Methods*, vol. 4, No. 9, Sep. 2007, pp. 717-719, "Tomographic phase microscopy.".
Debailleul, M., *Optic Letters*, vol. 34, No. 1, Jan. 1, 2009, pp. 79-81, "High-resolution three-microscopy of transparent inorganic and biological samples."
Barone-Nugent, E. D. et al., "Quantitative Phase-Amplitude Microscopy I: Optical Microscopy," *Journal of Microscopy*, vol. 206, Pt 3, pp. 194-203 (2002).
Bon, Pierre et al., "Quadriwave Lateral Shearing Interferometry for Quantitative Phase Microscopy of Living Cells," *Optics Express*, vol. 17, No. 15, pp. 13080-13094 (2009).
Cotte, Yann et al., "Microscopy Image Resolution Improvement by Deconvolution of Complex Fields," *Optics Express*, vol. 18, No. 19, pp. 19462-19478, (Sep. 13, 2010).
Cuche, Etienne et al., "Simultaneous Aplitude-Contrast and Quantitative Phase-Contrast Microscopy by Numerical Reconstruction of Fresnel Off-Axis Holograms," *Applied Optics*, vol. 38, No. 34, pp. 6994-7001 (1999).
Fienup, J. R., "Reconstruction of an Object from the Modulus of Its Fourier-Transform," *Optics Letters*, vol. 3, No. 1, pp. 27-29 (1978).
Gerchberg, R. W. et al., "A Practical Algorithm for the Determination of Phase from Image and Diffraction Plane Pictures," *Optik*, vol. 35, No. 2, pp. 237-246 (1972).
Gureyev, T. E. et al., "Phase Retrieval with the Transport-of-Intensity Equation: Matrix Solution with Use of Zernike Polynomials," *Journal of the Optical Society of America a-Optics Image Science and Vision*, vol. 12, No. 9, pp. 1932-1941 (1995).
Liebling, Michael et al., "Complex-Wave Retrieval from a Single Off-Axis Hologram," *Journal of the Optical Society of America. A, Optics and Image Science, Optical Society of America*, vol. 21, No. 3, pp. 367-377, (Mar. 1, 2004).
Marian, A. et al., "On the Complex Three-Dimensional Amplitude Point Spread Function of Lenses and Microscope Objectives: Theoretical Aspects, Simulations and Measurements by Digital Holography," *Journal of Microscopy*, vol. 225, Pt 2, pp. 156-169 (2007).
Maurer, Christian et al., "Refining Common Path Interferometry with a Spiral Phase Fourier Filter," *Journal of Optics A: Pure and Applied Optics*, 11 (9), 094023 pp. 1-7, (2009).
Popescu, Gabriel, "Quantitative Phase Imaging of Nanoscale Cell Structure and Dynamics," *Methods in Cell Biology*, vol. 90, pp. 87-115 (Elsevier Academic Press Inc, San Diego, 2008).
Schermelleh, Lothar et al., "Subdiffraction Multicolor Imaging of the Nuclear Periphery with 3D Structured Illumination Microscopy," *Science*, vol. 320, No. 5881, pp. 1332-1336, (Jun. 6, 2008).
Teague, Michael R., "Image-Formation in Terms of the Transport-Equation," *Journal of the Optical Society of America a-Optics Image Science and Vision*, vol. 2, No. 11, pp. 2019-2026 (1985).
Totzeck, M. et al., "Phase-Singularities in 2D Diffraction Fields and Interference Microscopy," *Optics Communications*, vol. 138, No. 4-6, pp. 365-382, (Jun. 1, 1997).
Yang, Guo-Zhen et al., "On the Amplitude-Phase Retrieval Problem in Optical Systems," *Acta Physica Sinica*, vol. 30, No. 3, pp. 410-413 (1981).

\* cited by examiner

CTF phase flattening

(a) Calibration traget (b) Calibration 3D Spectrum (c) Illumination Rotation Case
$\theta = 0°$ (d) Sample Rotation Case
$\theta = 0°$ Table 1:

| FIB$_{nominal}$ | distance | error source | unit | 600nm | 500nm | 400nm | 300nm |
|---|---|---|---|---|---|---|---|
| SEM: | $d \pm \Delta$ | reading | [nm] | 600 ± 5 | 498 ± 5 | 403 ± 5 | 304 ± 5 |
| DHM: | $\theta \pm \overline{\Delta \theta}$ | mean reading | [degree] | 31.6 ± 2.1 | 42.1 ± 2.9 | 50.9 ± 4.6 | 90 ± 10 |
| (with Eq. (5)) | $\bar{d} \pm \overline{\sigma_d}$ | mean propagated | [nm] | 614 ± 30 | 485 ± 25 | 414 ± 16 | ≤ 320 |

Figure 25

Figure 26

Table 2

| aberration | spherical harmonics | fitted amplitude $[10^{-9}]$ |
|---|---|---|
| defocus | $A_{2,0}$ | 45 |
| primary spherical aberration | $A_{4,0}$ | 350 |
| secondary spherical aberration | $A_{6,0}$ | -600 |
| primary coma | $A_{3,1}$ | 400 |
| primary astigmatism | $A_{3,2}$ | 25 |

Figure 27

Table 3

| | | | | | |
|---|---|---|---|---|---|
| SEM measurement | (η±5)[nm] | 600 nm | 498 nm | 403 nm | 304 nm |
| Raw | (p-t-p±56)[nm] | 629 | 448 | – | – |
| | contrast [%] | 60 | 22 | – | – |
| | FWHM [nm] | 230 | 285 | – | – |
| standard deconvolution | (p-t-p±56)[nm] | 629 | 452 | – | – |
| | contrast [%] | 77 | 50 | – | – |
| | FWHM [nm] | 223 | 233 | – | – |
| complex deconvolution | (p-t-p±25)[nm] | 594 | 482 | 372 | 275 |
| | contrast [%] | 80 | 96 | 69 | 25 |
| | FWHM [nm] | 224 | 196 | 182 | 141 |

COMPLEX INDEX REFRACTION TOMOGRAPHY WITH SUB λ/6-RESOLUTION

This application is the U.S. national phase of International Application No. PCT/IB2011/051306, filed 28 Mar. 2011, which designated the U.S. and claims priority to WO Application No. PCT/IB2010/051345, filed 28 Mar. 2010, the entire contents of each of which are hereby incorporated by reference.

1 BACKGROUND OF THE INVENTION

High resolution imaging of microscopic objects based on waves propagating in the far field meets known limitations due to their limited spectrum associated with their limited energy. These limitations of the spectrum apply in the time as well as in the spatial domain. These bandwidth limitations introduce naturally a band-stop or band rejection filter in the spatial frequency domain (SFD). The occupation of the SFD is therefore limited to an area or most often a disk of diameter twice as large as the bandwidth of the optical system bandwidth. This problem has been described in basic textbooks such as {Goodman, 1968}. Due to the band-stop BS described earlier: $k_x$, $k_y \in BS$, the angular spectrum: complex amplitude as a function of the unit vector $\hat{s}(k_x/k, k_y/k, \sqrt{k^2-k_x^2-k_y^2}/k)$ of the beam diffracted by the object. The components $\hat{s}_x$ and $\hat{s}_y$ are included in the unit disk in the x-y plane. The further limitations are due to instrumental considerations: the effective spectrum of the wavefield is further diminished by the configuration of the instrument collecting the emitted or scattered wave in a cone intercepting the pupil of the microscope objective (MO). Mathematically, the angular spectrum is limited by to the Numerical Aperture (NA) of the MO. It appears multiplied by a complex function called the "coherent transfer function" of the instrument (CTF), which is also the Fourier transform of the complex Amplitude Point Spread Function (APSF). The square of the amplitude of the APSF is the IPSF (Intensity Point Spread Function) or more commonly the PSF in the state of the art. The PSF is usually considered to qualify the intensity images. The autocorrelation of the CTF is the Fourier transform of the PSF and is usually denominated Optical Transfer Function: OTF and noted $C(k_x,k_y)$, and is usually considered as a descriptor of the bandwidth of the optical instrument.

The extension of the significant spectrum in the spatial frequency domain depends both on the spectrum of the specimen itself and on the transfer function of the instrument or microscope, which in general constitutes the limiting factor to image resolution. Techniques have been developed to restore the spectrum of the specimen complex wavefield from the specimen wavefield intensity in the space domain: the problem consists in making a "guess" on the complex wavefield and adjusting the propagated intensity to the actual measured intensity. RMSE minimization scheme are developed to solve this task. In particular, iterative algorithms have been proposed for phase retrieval from intensity data {Fienup}. In particular, the so-called Gerchberg-Saxton {Gerchberg, 1972}, error reduction algorithms {Fienup, 1978} {Yang, 1981} have been adapted to solve the inverse problem posed by the determination of the complex wavefield in microscopy. In many situations, the problem appears however as ill posed. It is computer intensive and the applications in optical microscopy appear quite limited. Another approach is based on the measurement of field intensity on planes situated at a plurality of axial distances z (Teague, 1983). Quantitative phase imaging can be derived from the so-called "intensity transport equation" (Gureyev, 1995). The method has been applied successfully to various domains in microscopy (Nugent, 2001 #146). This technique, also designated by: transport intensity techniques: TIT, provides quantitative phase imaging, but has the drawback to be based on the computation of the derivative or gradient of the wavefield intensity, introducing thereby a high sensitivity to noise and artifacts. Similar remarks can be formulated for other quantitative phase microscopy techniques (Popescu, 2008) such as modified DIC, Hartmann-Shack wavefront analyzer or any analyzer derived from a similar principle, such as multi-level lateral shearing interferometers (Bon 2009), or in an other variant "spiral phase plate" microscopy (Maurer, 2008), which provide quantitative phase images by integration of a differential signal resulting from interferences or Fourier filtered pupil signal: artifacts and parasitic signals.

Digital Holographic Microscopy: DHM (Cuche, 1999) is based on the holographic approach, i.e. the determination of the complex field of the radiated wave from its interference (hologram) with some reference wave generated externally to or internally from the radiated wave itself. The complex field reconstructed from a hologram appears more robust and immune to artifacts and possibly, with some improvement, to noise. For that reason, it appears as a preferred embodiment of the proposed method, although the disclosed method apply to any complex field of the wave radiated by the specimen measured by any instrument or microscopy, in particular the above mentioned, non holographic approaches.

In the general context of optics and microscopy in particular, the problem of the resolution limit is posed in term of the smallest distance separating two distinguishable objects, generally point sources. It is well known that different criteria have been proposed for this purpose. Up to the recent times, the only characteristic of the field to be considered in these criteria has been the intensity of the field collected by the instrument and used to form the specimen image. In this context the degree of coherence has been shown to play an important role in the image resolution. Coherently illuminated imaging systems suffer from an inferior lateral resolution compared to its incoherent counterpart. This aspect is further intensified by a variety of post-processing methods to improve the image quality of incoherent light microscopy. Many 2D deconvolution methods can be applied to improve image quality, like deblurring, of incoherent imaging systems and 3D deconvolution techniques give rise to enhanced optical sectioning capability. Based on iterative expectation-maximization algorithm for maximum-likelihood deconvolution of incoherent images, even super-resolution has been demonstrated at the cost of computational power. All such efforts made deconvolution a common post-processing method for biological applications such as deconvolution of fluorescence microscopy images. Consequently, it is disclosed in the present patent how bring the conveniences of improved resolution to coherent microscopy too.

The high-resolution three-dimensional (3D) reconstruction of weakly scattering objects is of great interest for biomedical research. Diffraction tomography has been demonstrated to yield for 3D refractive index (RI) distributions of biological samples. For the use of such techniques in the field of virology and cancerology, a spatial resolution in the sub-200 nm domain is required. Consequently, experimental setups must shift to shorter wavelengths, higher numerical apertures (NA) and steeper illumination and/or sample rotation angles. However, the scaling of resolution to high-NA systems introduces strong diffraction and aberration sensitivity. The use of MO under non-design rotation conditions introduces additional experimental aberrations that may further degrade resolution. Unfortunately, the theory of diffraction tomography cannot correct for these conditions since it is based on direct filtering by an ideal Ewald sphere.

Therefore, we present a new approach that effectively reconstructs the object scattered field with high-NA and under non-design imaging conditions. Opposed to classical reconstruction methods like filtered back projection, we suggest an inverse filtering by a realistic coherent transfer function (CTF), namely 3D complex deconvolution.

More recently, as described previously, the capability of new phase microscopy, QPM and DHM in particular to image simultaneously amplitude and quantitative phase measurements makes it an attractive research tool in many fields, in particular biological research since it is marker free, non-invasive regards the light intensity and only camera shutter time limited. This innovation field in microscopy strongly motivates a revision of the concept of resolution limit in microscopy.

It is the main goal of the disclosed method to show how the consideration of the complex field, preferentially to the intensity of the field, can bring an improvement of the resolution limit in microscopy. This demonstration will be brought in the particular case of optical microscopy, but the validity of the method extends far beyond optical microscopy.

In the field of the so-called "superresolution", the general idea is to utilize degrees of freedom that are deemed unnecessary. For example they can be in real space, in temporal domain, in spectral domain, or in polarization. Generally, these methods require to alter the experimental setup with additional modifications e.g. gratings or mechanically moving parts, giving rise to practical issues. By using the phase-retrieval method of Gerchber-Saxton, it has been tried to improve space and time multiplexing. The major contribution of new microscopy techniques which provide a full image of the complex field of the wave radiated from the specimen is that, contrary to intensity based microscopy techniques, it preserves fully the degrees of freedom associated with the wavefield, in particular the electromagnetic field. In particular, DHM offers the advantage of providing the amplitude A as well as the phase $\phi$ from the reconstructed complex field U. Time multiplexing methods combined with DHM methods have been demonstrated to work with low-NA systems but still owe the proof of scalability to high-NA. For 'midrange' systems of NA=0.42, a resolution improvement of nearly a factor 2 is possible with a synthetic aperture, however, requiring the usage of scanning devices. Other coherent light methods like structured illumination microscopy (SIM) use coherent excitation for intensity based fluorescence imaging. Despite of demonstrating sub-wavelength resolution by phase structuring, the complex detection is only partially used in excitation.

In a first embodiment, the invention teaches how the experimental observation of systematically occurring phase singularities in phase imaging of sub-Rayleigh distanced objects can be exploited to relate the locus of the phase singularities to the sub-Rayleigh distance of point sources, not resolved in usual diffraction limited microscopy.

In a second, preferred embodiment, the disclosed method teaches how the image resolution is improved by complex deconvolution. Accessing the object's scattered complex field—containing the information coded in the phase—and deconvolving it with the reconstructed complex transfer function (CTF) is at the basis of the disclosed method. It is taught how the concept of "Synthetic Coherent Transfer Function" (SCTF), based on Debye scalar or Vector model includes experimental parameters of MO and how the experimental Amplitude Point Spread Functions (APSF) are used for the SCTF determination. It is also taught how to derive APSF from the measurement of the complex field scattered by a nano-hole in a metallic film.

In a third, preferred embodiment, the disclosed method teaches a strategy to improve the efficiency of the complex deconvolution method based on a fine tuning of the Synthetic Coherent Transfer Function SCTF is disclosed, which is based on the definition of well defined criteria:

1) Criteria based on one side on the quality of the fit of the physical model for CTF to the experimental CTF measured with the instrument.
2) On the µ-posteriory evaluation of the quality of the deconvolved image which is the base of an iterative technique consisting in adjusting the SCTF parameters on the basis of criteria about the physical reality of the deconvolved image. In particular, the so-called "Phase flattening" postulates the constancy of the phase of the deconvolved phase image, outside the specimen image.

In a fourth embodiment, the invention teaches how the limit of resolution can be extended to a limit of 216 or smaller. It is a further development of the symmetric singularity concept. Based on these ideas, the method indicates how to overcome wavelength or tilting angle limitations.

In a fifth embodiment, the invention teaches how the presented method can be generalized to a tomographic approach that ultimately results in super-resolved three-dimensional RI reconstruction of biological samples.

2 BRIEF DESCRIPTION OF THE DRAWINGS

A detailed description of the elements of the present invention, together with a detailed description of the embedded artwork is given below. It must be emphasized that the drawings are solely for the purpose of illustration and do not in any way limit the scope of the invention.

FIG. 1: SEM image of couple of nano-holes drilled by FIB in aluminum film at 100 000 magnification. The images show nominal center-to-center pitches $\eta$ of 600 nm (a), 500 nm (b), 400 nm (c) and 300 nm (d) with according scale bars.

Figure 2:
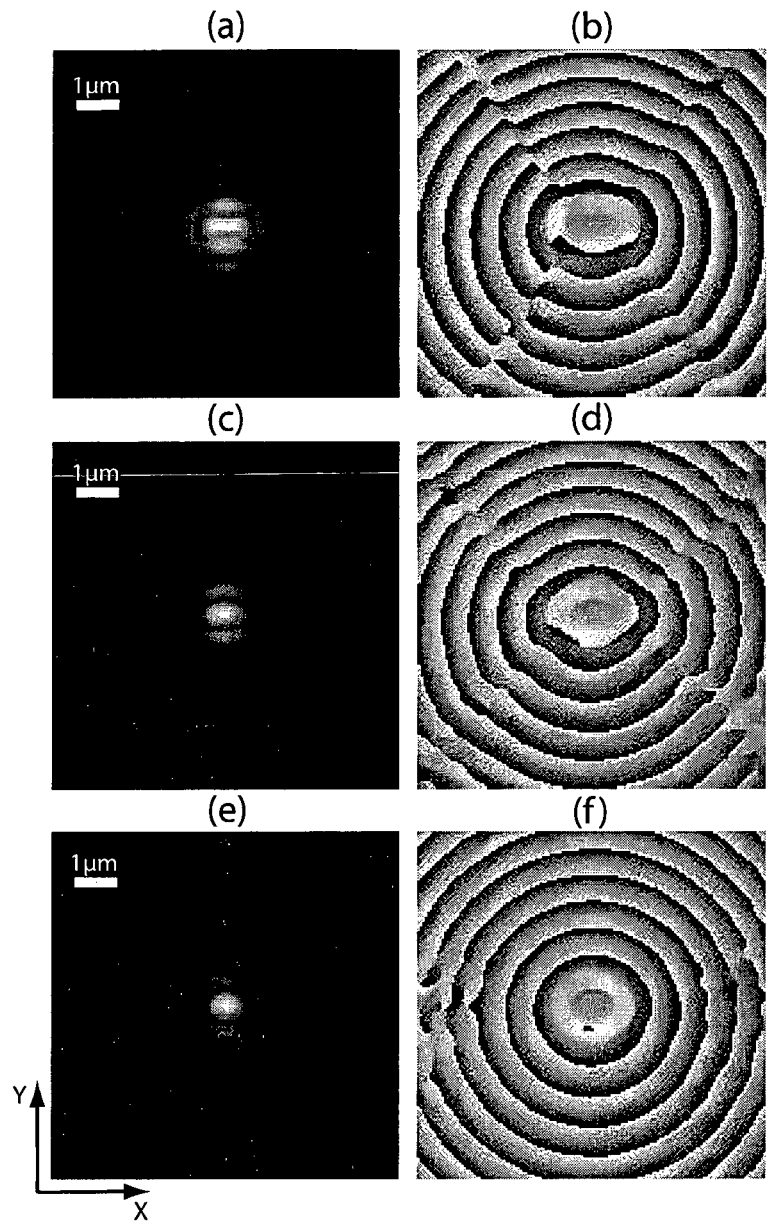

FIG. 2: DHM experimental images in focal plane for $\lambda$=532 nm and $NA_{eff}$=0.83 of test target (cf. FIG. 1 (b)-(d)). Respectively displayed in (a) and (b) are the amplitudes and their corresponding phases of two nano-holes at a center-to-center distance of d=500 nm. (c-d) are the according results for d=400 nm and (e-f) for d=300 nm.

Figure 3:
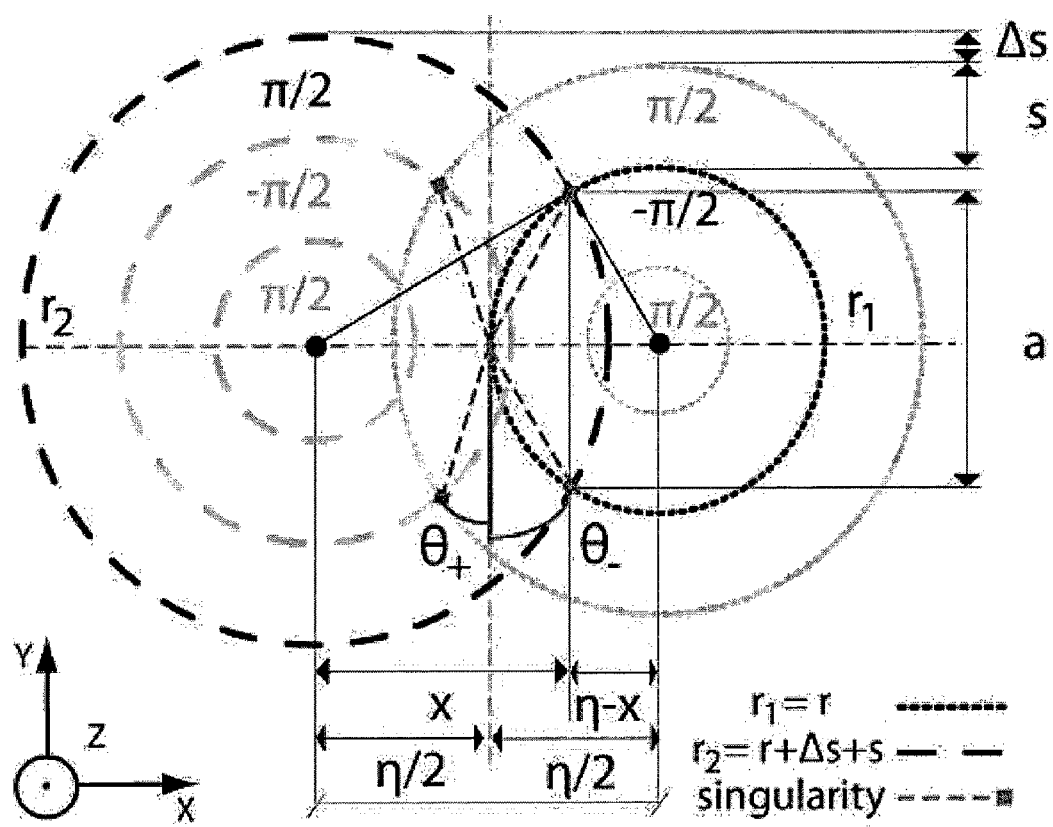

FIG. 3: Schematic illustration of image plane in phase. Circles show contours of equal phase emitted from two point sources located the circles' center.

Figure 4:
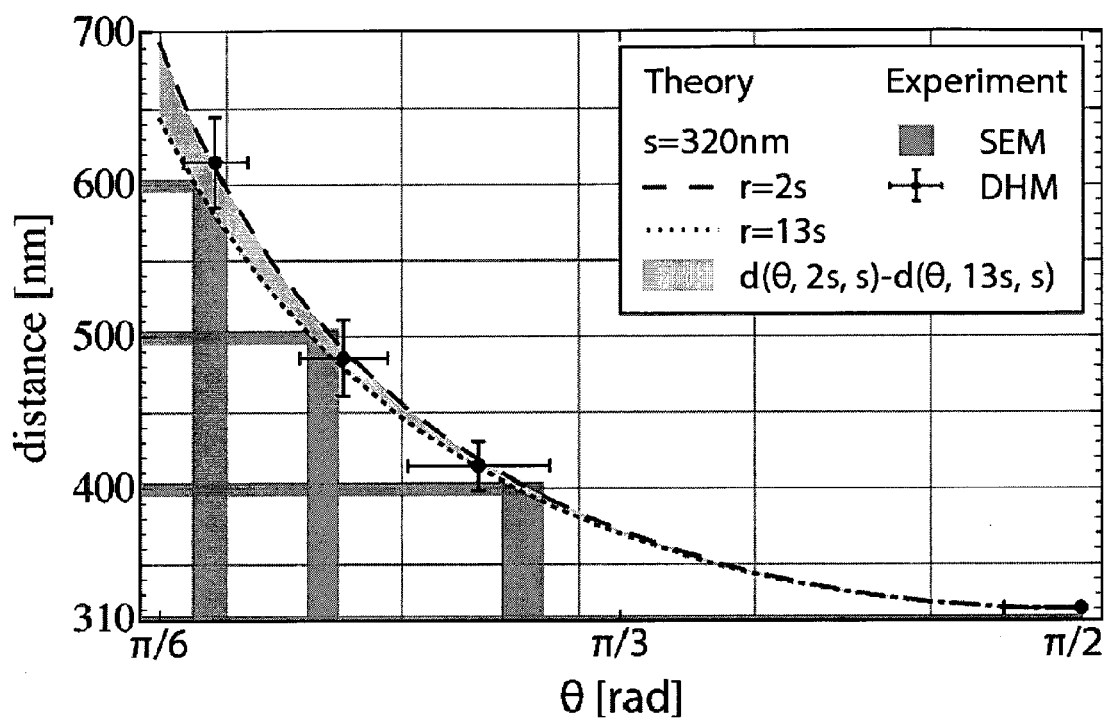

FIG. 4: Deduction of nano-hole distances from angle $\theta$ of phase singularities for $\lambda$=532 nm and $NA_{eff}$=0.83. The line plot indicates the theoretical relation for different reference radii r. The points and grey bars indicate the experimental results from Tab. 1 and their according range of trust.

Figure 5:
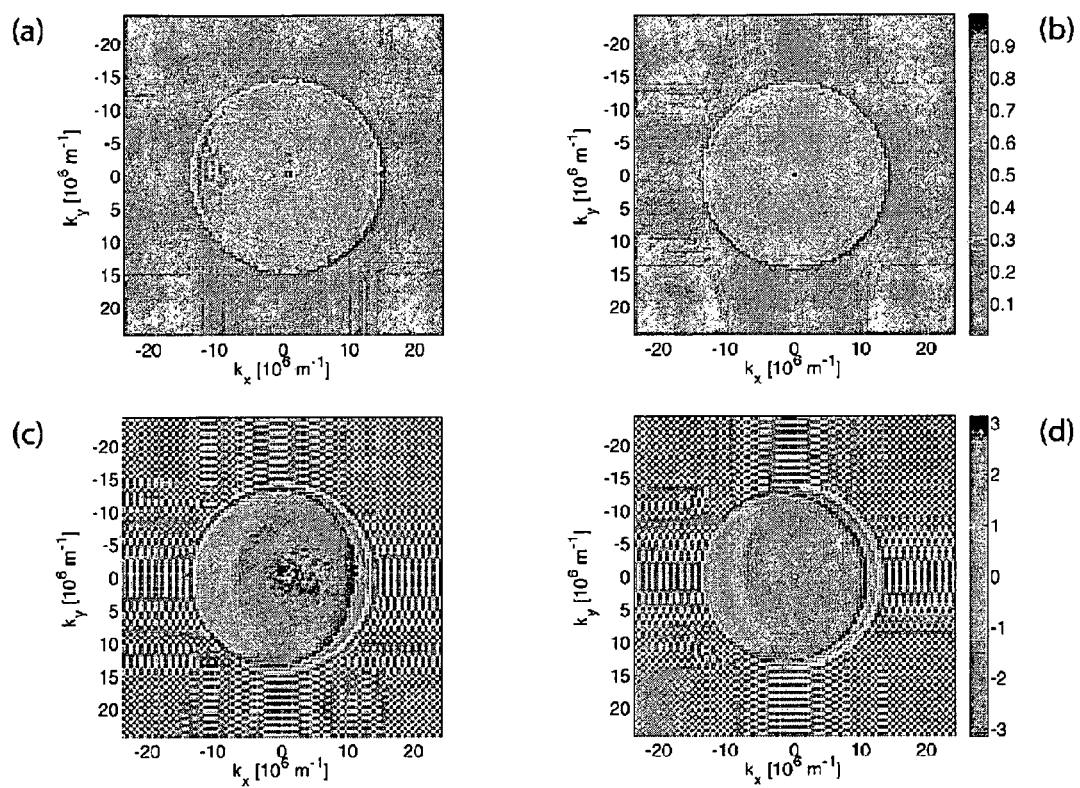

FIG. 5: Experimental and synthetic transfer functions in focal plane at $\lambda$=532 nm and NA=0.95 of the test target (cf. FIG. 1). The experimental amplitude CTF $|c_{exp}|$ (a) and phase CTF $arg[c_{exp}]$ (c) are imaged from a single nano-metric aperture. According to Eq. 22, (b) shows the fitted synthetic amplitude CTF $|c_{syn}|$ and (d) its phase part $arg[c_{syn}]$.

Figure 6:
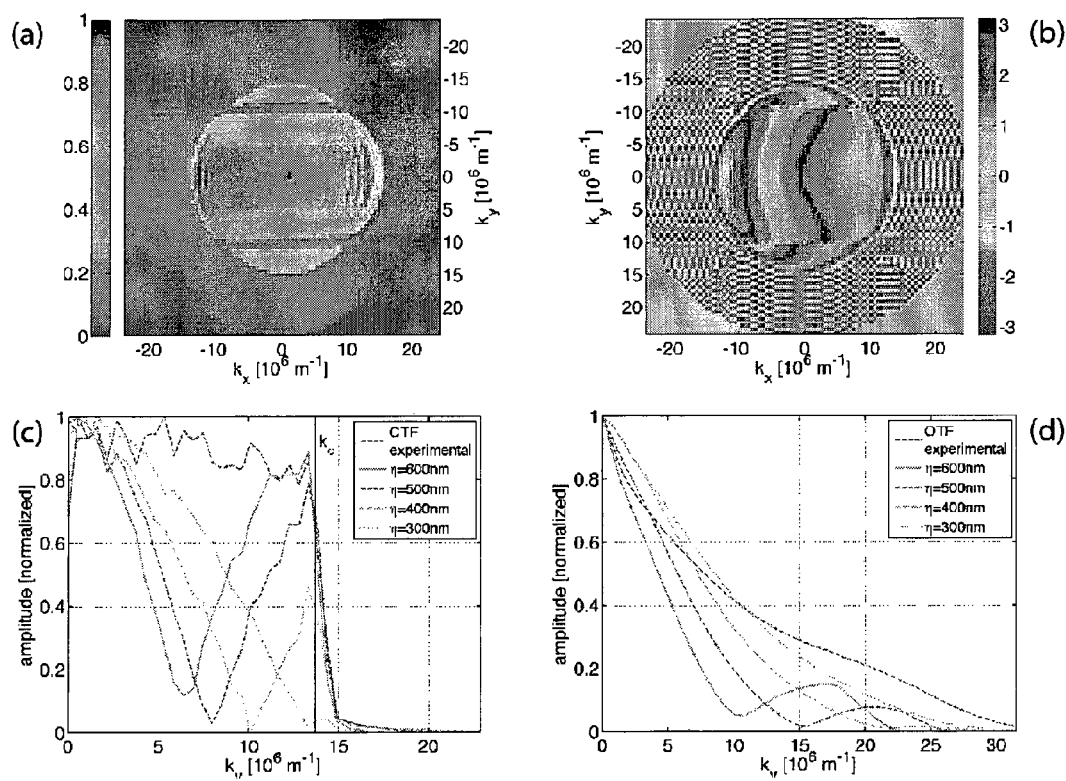

FIG. 6: Experimental transfer functions of in focal plane at $\lambda$=532 nm and NA=0.95 of the test target (cf. FIG. 1) The $\Gamma$-masked amplitude spectrum $|\tilde{G}|$ (a) and phase spectrum $arg[\tilde{G}]$ (b) are illustrated for $\eta$=400 nm. (c) compares $|\tilde{G}|$ cross-sections in $k_y$ for $k_x$=0 with the experimental CTF of a single nano-metric hole. (d) shows the same comparison with the experimental OTF.

Figure 7:
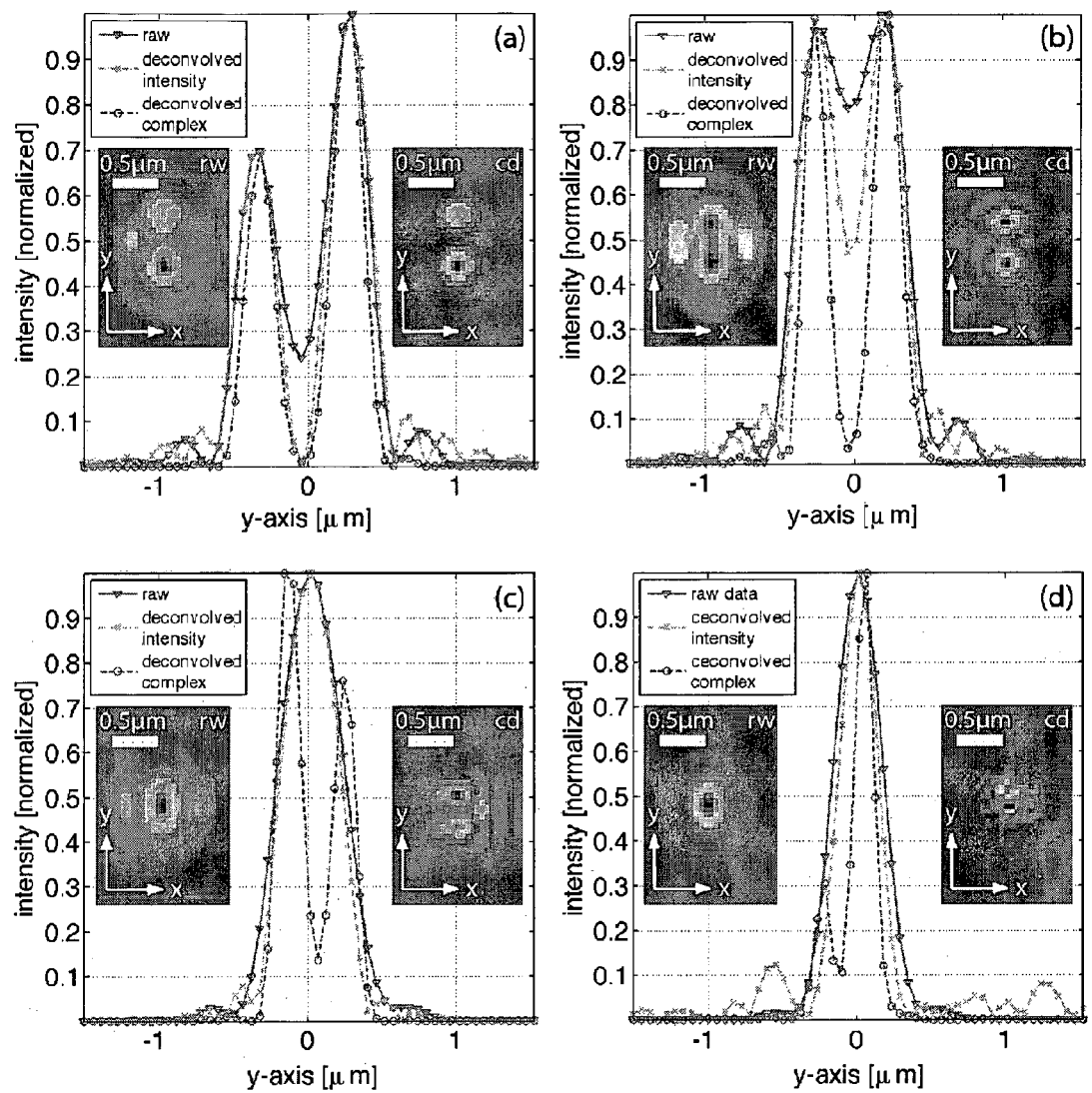

FIG. 7: Comparisons of unresolved and super-resolved profiles of two nano-holes of test target (cf. FIG. 1 (b)-(d)) with center-to-center distances η=600 nm in (a), η=500 nm in (b), η=400 nm in (c), and η=300 nm in (d). The raw data images I are reconstructed in the focal plane at λ=532 nm and NA=0.95. The 'raw data' profile shows the central y cross-section of the resolution limited raw data I (cf. 'rw' insert). The 'exp deconv' profile shows the corresponding amplitude section after complex deconvolution $|o|^2$ (cf. 'cd' insert) with the experimental CTF $c_{exp}$. Additionally, 'standard deconv' compares the profile of the inverse filter deconvolution in intensity $o_i$.

Figure 8:
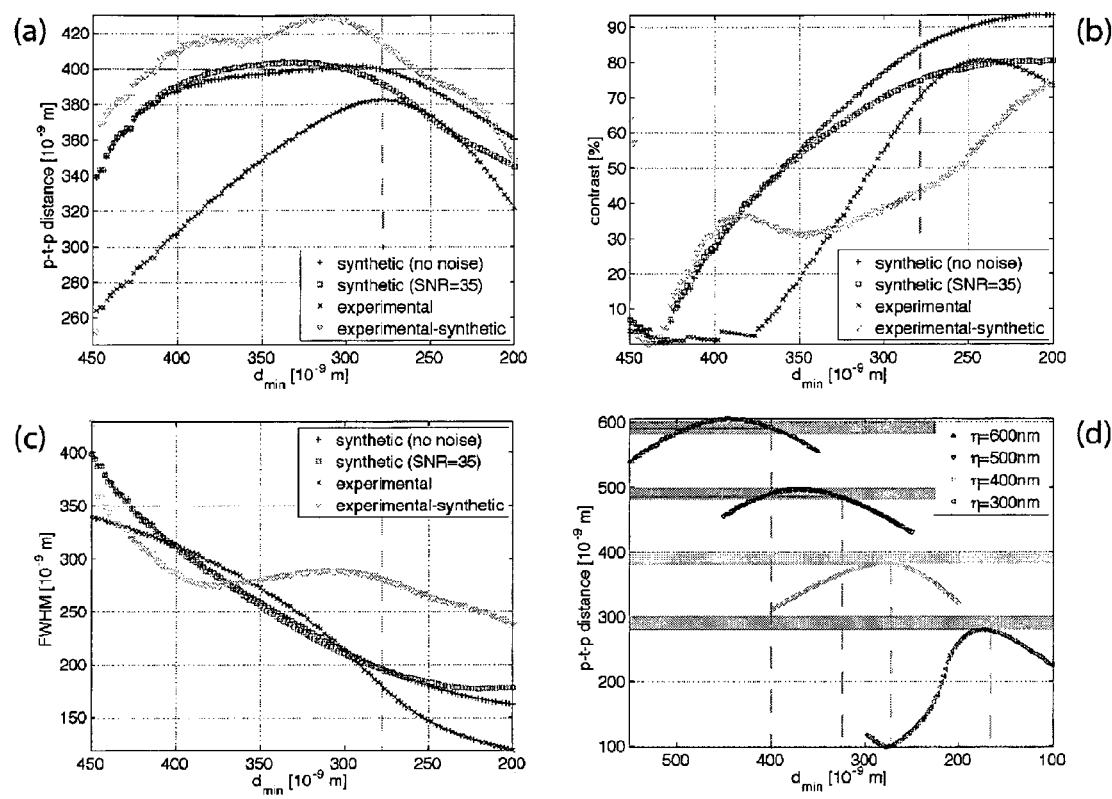

FIG. 8: Influence of $k_{max}(d_{min})$ on complex deconvolution results according to Eq. (4). (a-c) statistics for h=400 nm for deconvolution of $U_{exp}$ with $c_{exp}$ 'experimental', for deconvolution of $U_{exp}$ with $c_{syn}$ 'experimental-synthetic', for deconvolution of $U_{syn}$ with $c_{syn}$ 'synthetic (no noise)', and deconvolution of $U_{noise}$ with $c_{noise}$ 'synthetic (SNR=35)'. (d) statistics of p-t-p in dependence of $d_{min}$ for all targets η. The according color bars indicate error margin of 25 nm.

Figure 9:
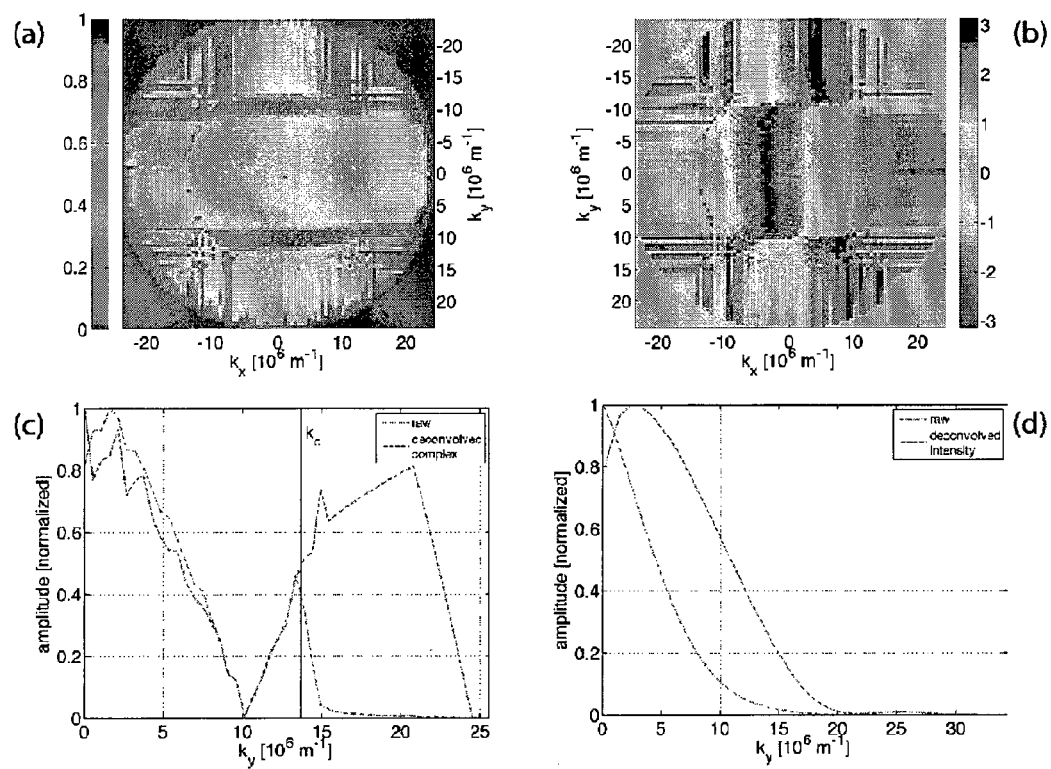

FIG. 9: Experimental transfer functions of in focal plane for λ=532 nm and NA=0.95 of test target (cf. FIG. 1) after deconvolution. The amplitude spectrum |O| (a) and phase spectrum arg[O] (b) are illustrated for η=400 nm after division by CTF. (c) compares |O| cross-section in $k_y$ for $k_x$=0 for the η=400 nm case. (d) shows the same comparison.

Figure 10:
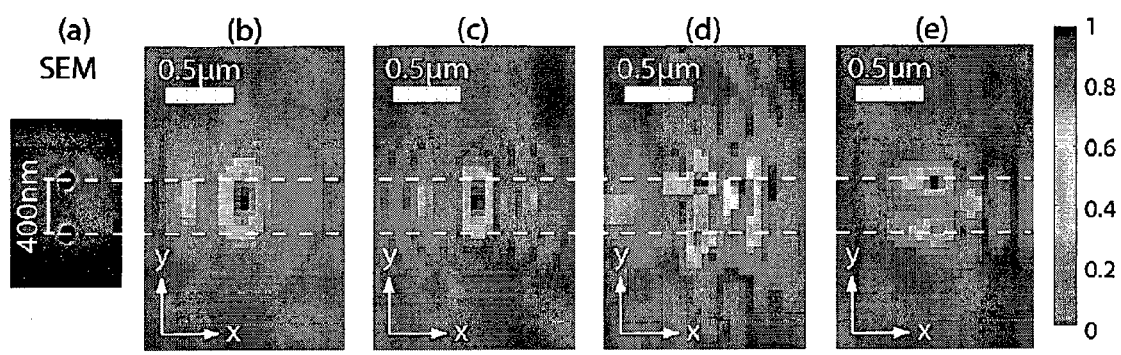

FIG. 10: XY images in focal plane of test target with sub-resolution pitch h=400 nm (cf. insert (a) imaged by SEM). Insert (b) shows the unresolved test target's raw image I at λ=532 nm and NA=0.95. Insert (c) shows $o_i$ resulting from intensity deconvolution. Insert (d) shows $|o|^2$ resulting from complex deconvolution by the synthetic CTF and insert (e) the according result for deconvolution by the experimental CTF.

Figure 11:
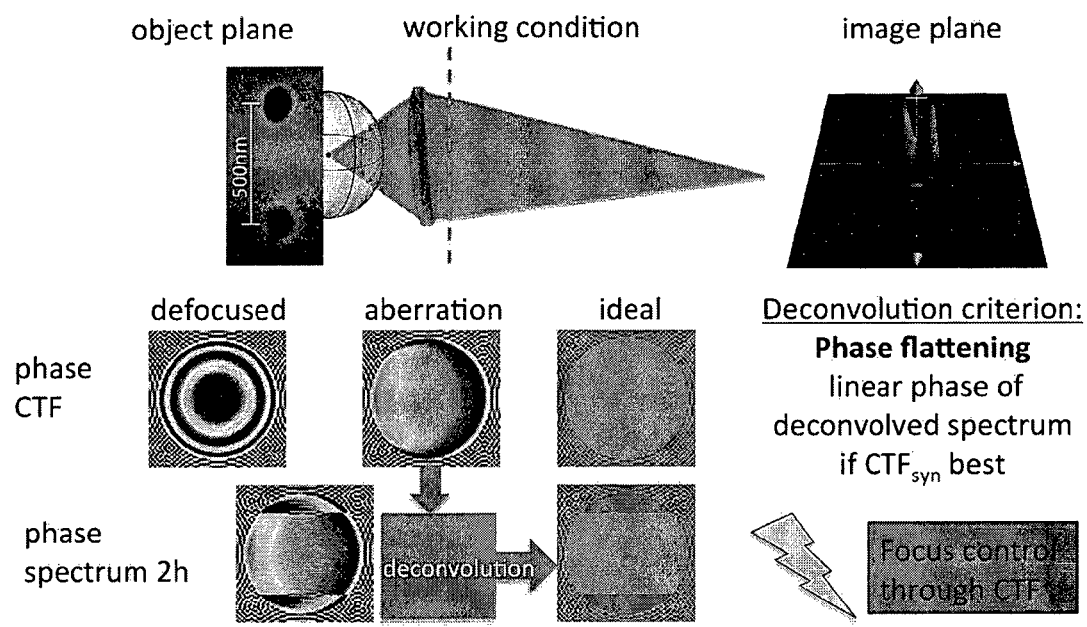

FIG. 11: Working principle of phase flattening based on SCTF for an optical system under working conditions.

Figure 12:
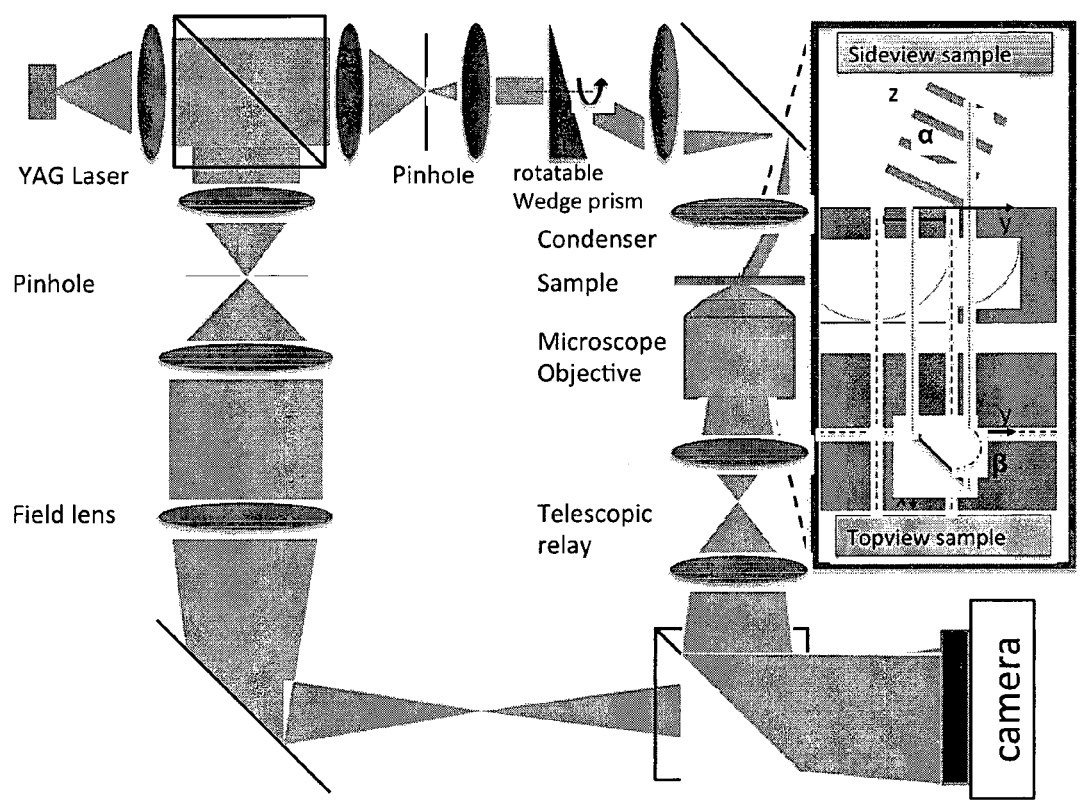

FIG. 12: Scheme of experimental setup. The test target is used in a transmission DHM configuration, additionally equipped with a rotatable wedge prism.

Figure 13:
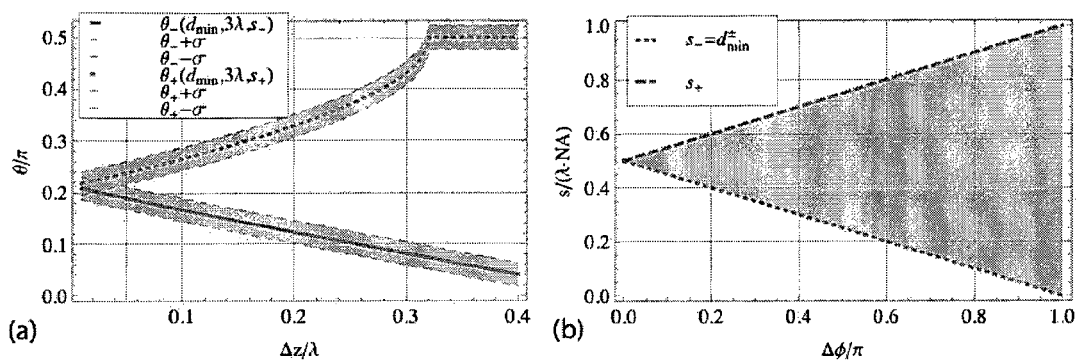

FIG. 13: Illustration of theoretical spatial resolution behavior based on asymmetric singularities. Plot (a) shows the singularities orientation with vertical precision σ versus a longitudinal displacement at a given distance. Plot (b) shows the dilated and contracted effective spacing as a function of the de-phasing, whereby the later one may be associated with d±min. The filled area indicates the advanced and retarded spacings' divergence.

Figure 14:
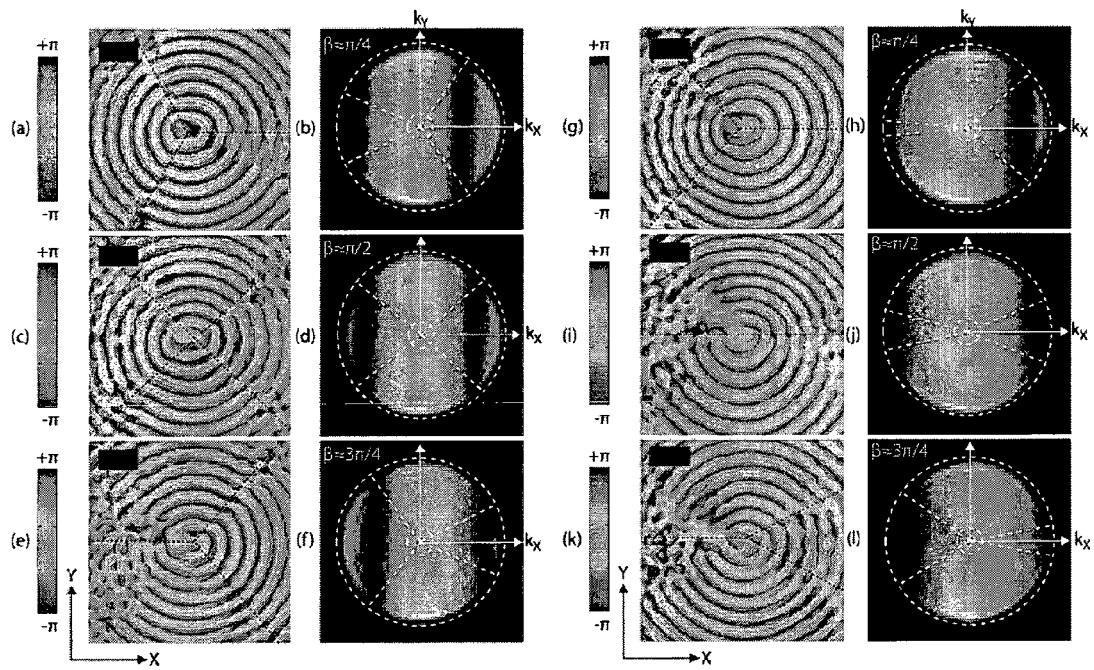

FIG. 14: Proof of principle measurements. The test target [η=400 nm] is imaged in phase (a,c,e) for different wedge prism orientations, β=[π/4, π/2, 3π/4] according to the scheme in FIG. 12. The scale bar is 2 μm×1 μm and the black stroke lines indicate the idealized singularities. Additionally, the log-amplitude spectra of the complex fields are given in inserts (b,d,f) for the respective β, including the spectrally measured θ± angles (white stroke lines). Images (g-l) show the according phase images and amplitude spectra for η=300 nm.

Figure 15:
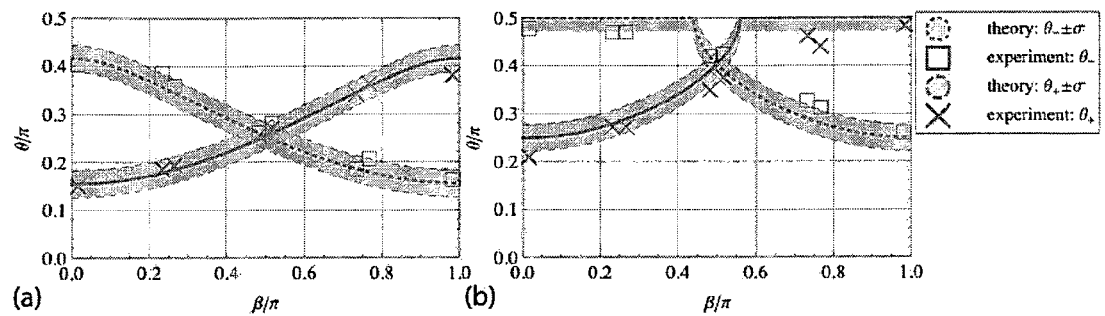

FIG. 15: Comparison of theory and experiment. For η=400 nm, the experimental θ± are plotted in insert (a), together with the theoretical behavior. Additionally, a vertical region of trust of σ=5° is indicated. In insert (b) the same comparison is shown for η=300 nm of FIG. 4(g-l).

Figure 16:
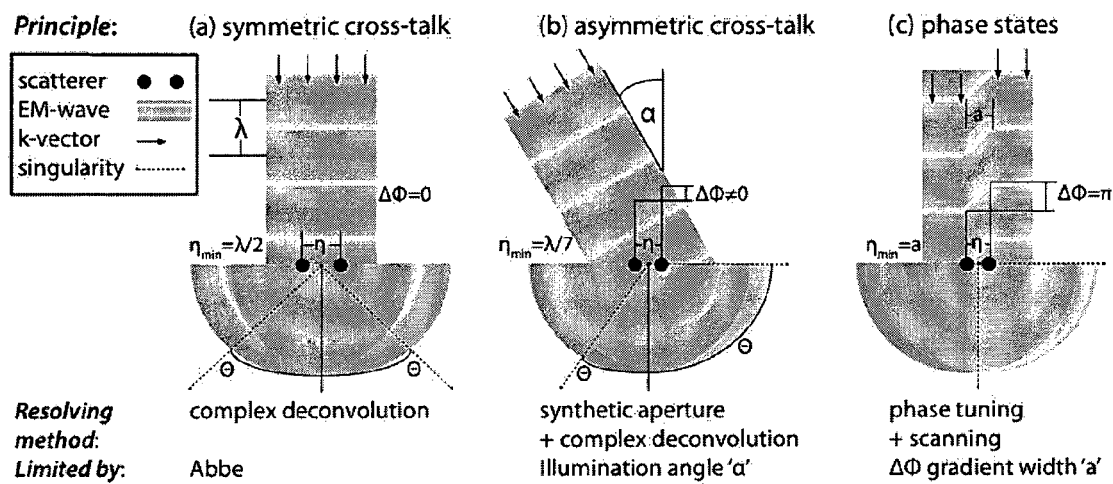

FIG. 16: Overview of concepts of lateral super-resolution techniques based on phase imaging.

Figure 17:
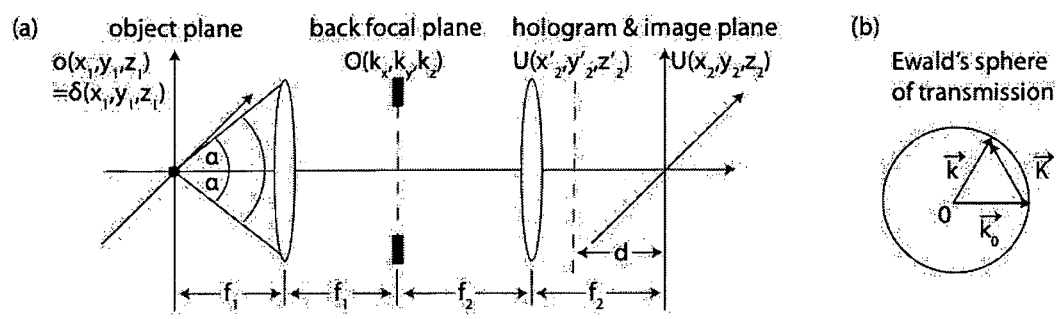

FIG. 17: Optical transfer of a point source in real and reciprocal space. In scheme (a), a practical Abbe imaging system with holographic reconstruction. In scheme (b), full Ewald's sphere under Born approximation in the reciprocal object plane.

Figure 18:
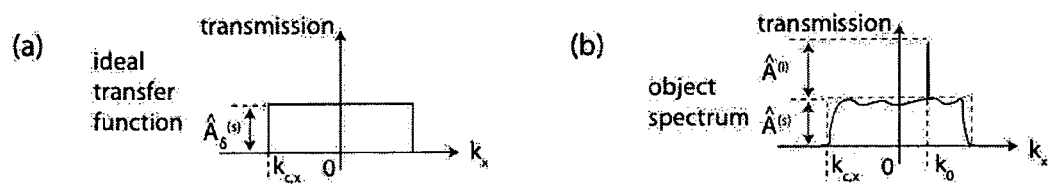

FIG. 18: Scheme of reciprocal space. In image (a), an ideal 1D coherent transfer function as given by the complex point source. In image (b), the image's spectrum with background illumination.

Figure 19:
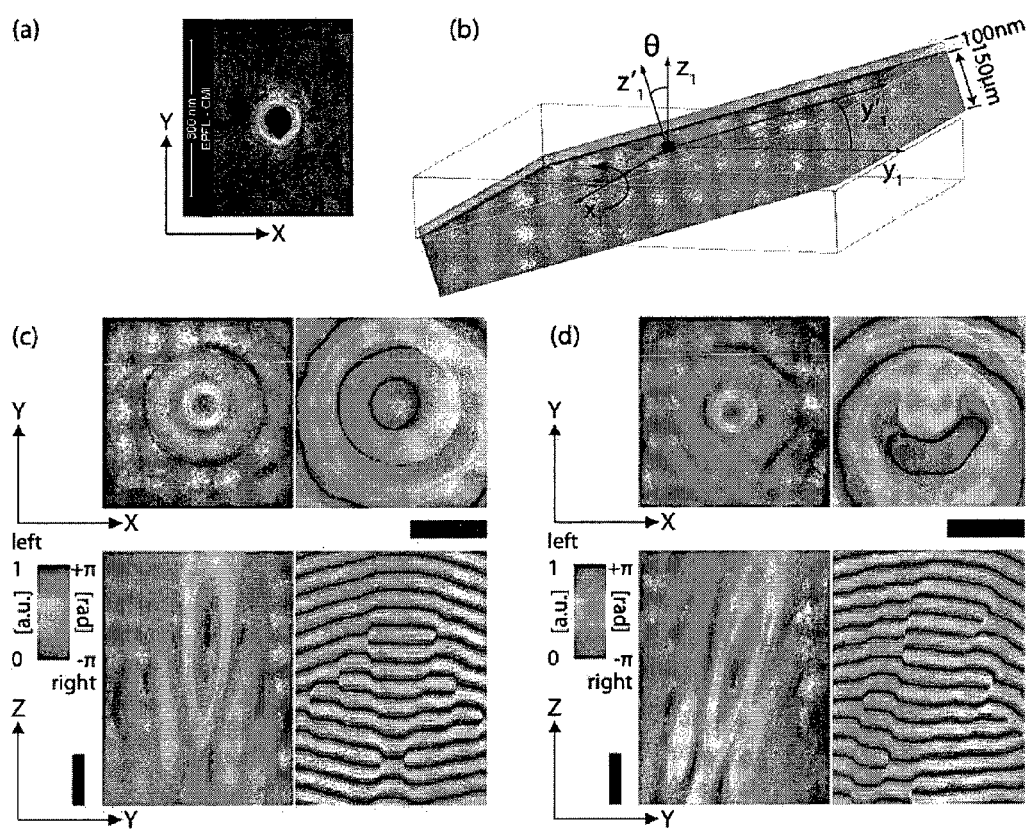

FIG. 19: Principle of complex point source in MO design and MO non-design imaging conditions. The scanning electron image at 150000× magnification in (a), shows an isolated nano-metric hole (≈75 nm) in a thin (100 nm) opaque aluminum film on a rotatable coverslip shown in (b). The experimental APSF sections in (c) yield for design MO imaging conditions (θ=0°), whereas sections in (d) yield for non-ideal conditions (θ=15°). The left sides show |h| central sections and the right side arg[h], respectively. Scalebar: 2 μm.

Figure 20:
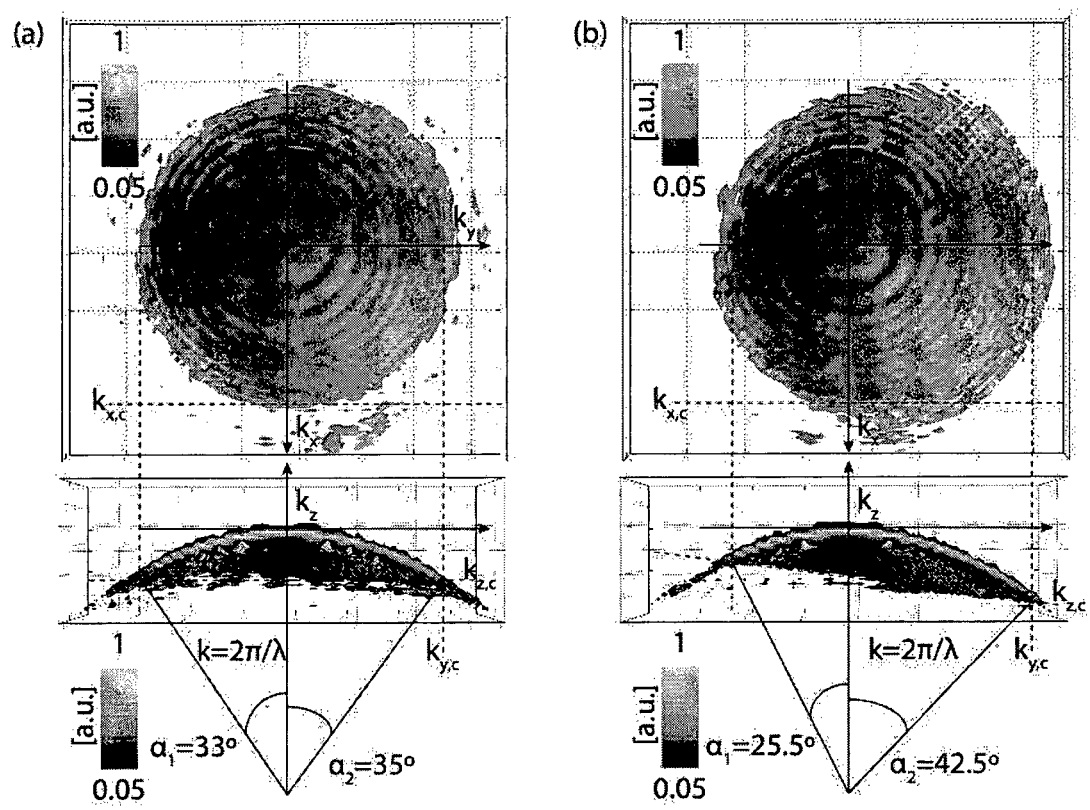

FIG. 20: Experimental 3D CTF in different imaging conditions. The experimental CTF in (a) yields for MO design imaging conditions (θ=0°), whereas the CTF depicted in (b) yields for non-design conditions (θ=15°), according to FIG. 2. The upper row shows the top view on the CTF and bottom row shows the side view through the CTF for $k_x$=0, respectively.

Figure 21:
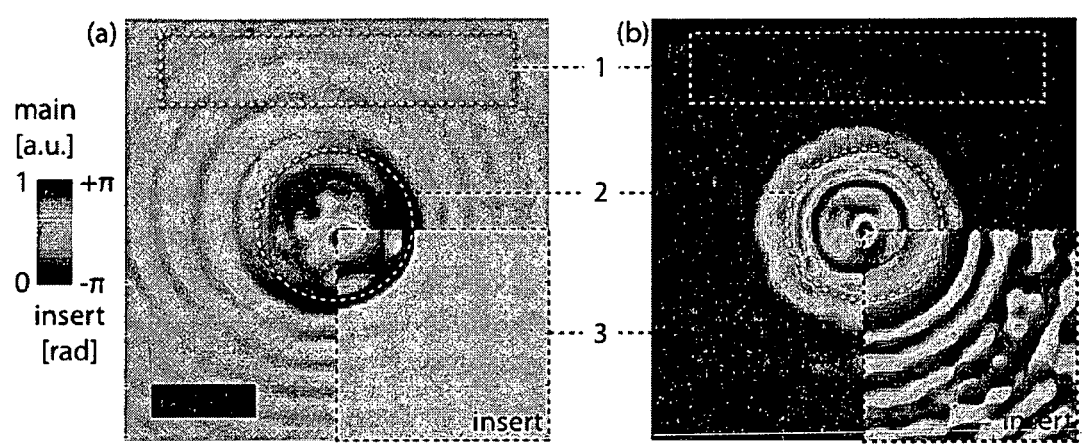

FIG. 21: Complex fields of polystyrene microspheres in water at a tilt angle of θ=15°. The main images show the raw amplitude (a) and the deconvolved amplitude (b) with background ROI-1 and object ROI-2 with circle ø≈5.8 μm. The inserts in ROI-3 show the phase parts, respectively. Colorbar, Scalebar: 4 μm.

Figure 22:
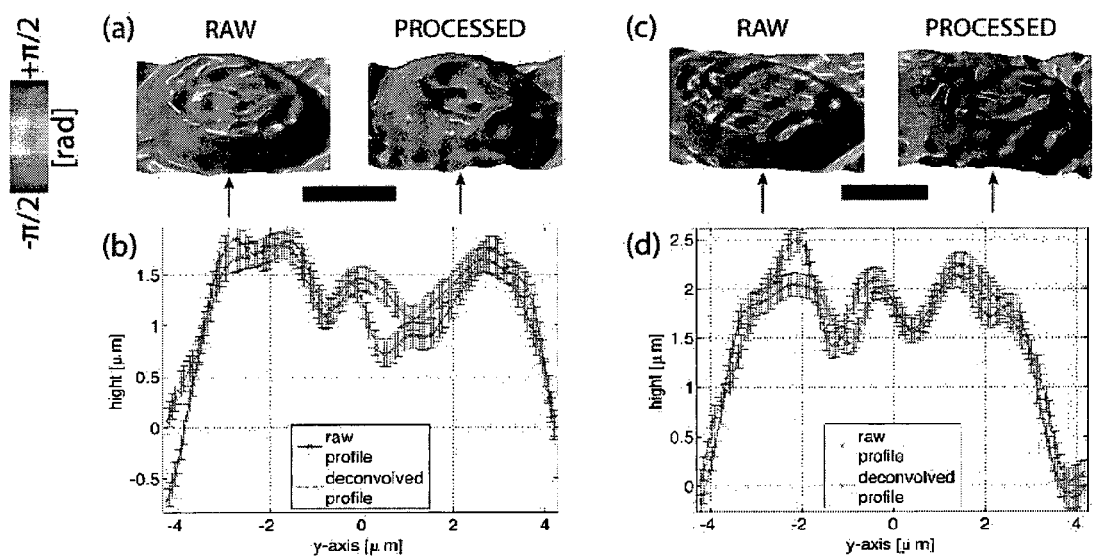

FIG. 22: Human RBCs in phase. Images (a) and (c) show the phase images of two RBCs. Unprocessed images are labeled 'RAW' and the label 'PROCESSED' indicates the deconvolved phase for τ=1. The phase profiles in (b) and (d) compare the phase height differences of images their phase images above at the central section indicated by the flashes. The error bars indicate the level of phase noise. Colorbar, Scalebars: 4 μm.

Figure 23:
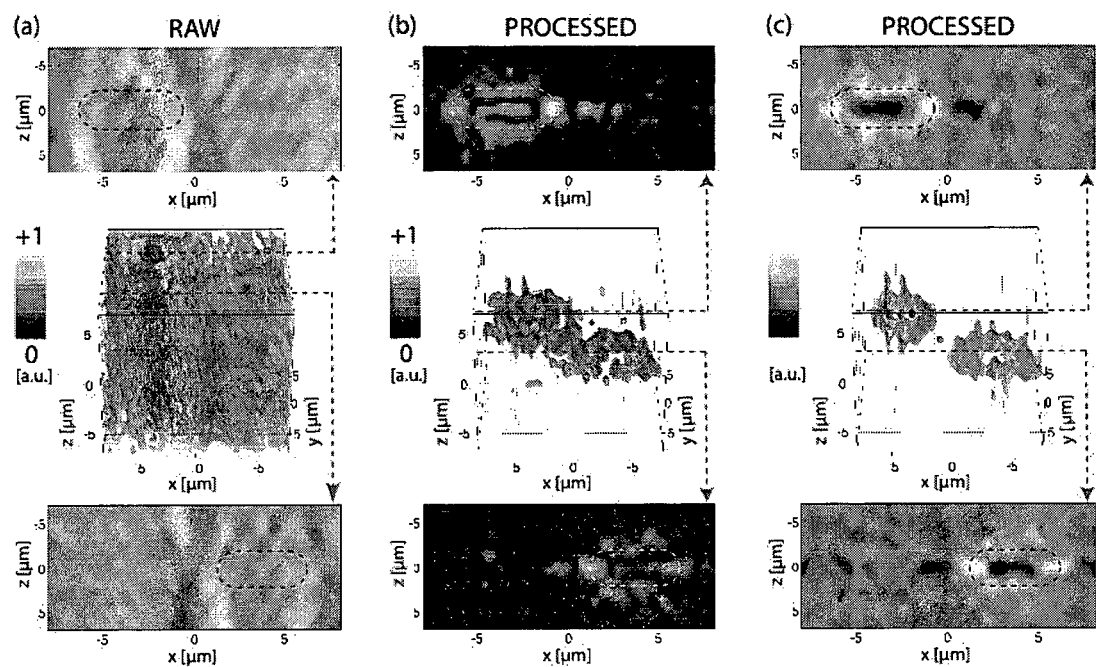

FIG. 23: 3D rendered images of two human RBC. Images (a) show |U| in 3D-space in the middle. Bottom and top images show the sections through the central RBC positions indicated by the flashes. Accordingly, the field $|o^{(s)}|$ is represented in (b), and |n| in (c) (uncalibrated levels), respectively. The stroked ovals in the sections indicates the RBCs' positions with area of 6 μm×2.5 μm.

Figure 24:
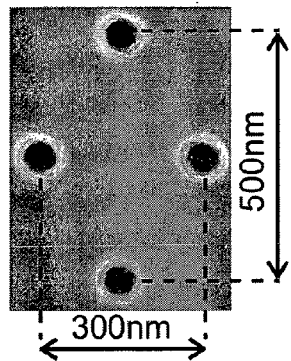
Figure 24:
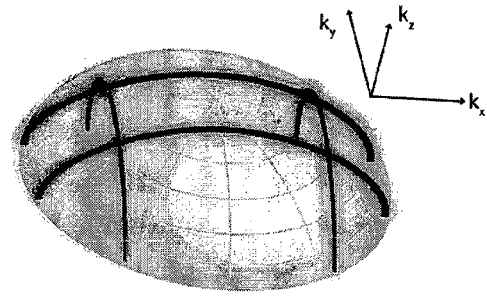
Figure 24:
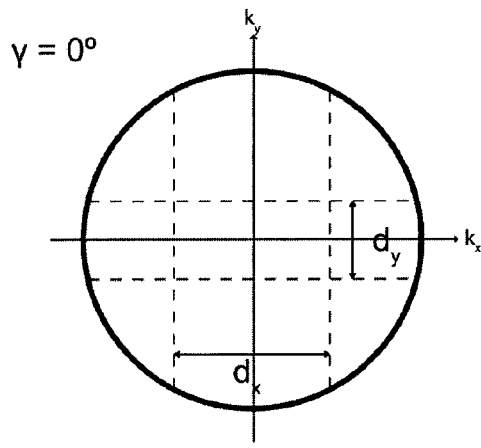
Figure 24:
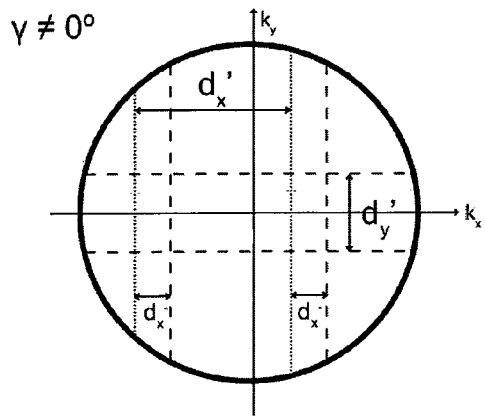
Figure 24:
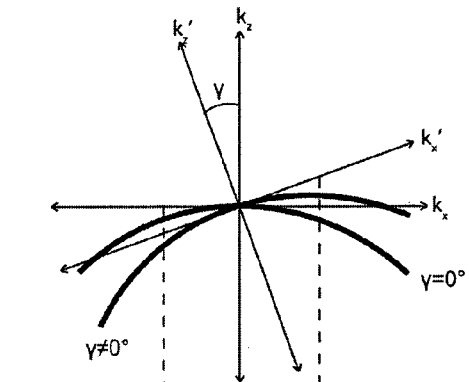
Figure 24:
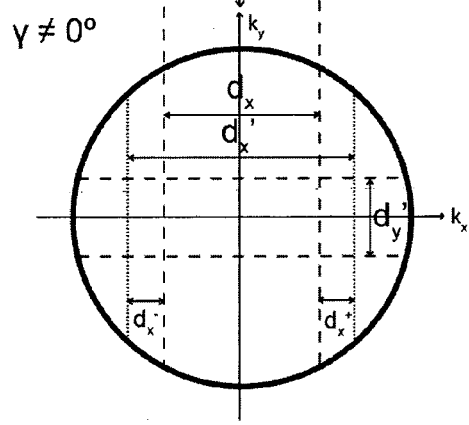

FIG. 24: Scheme for calibration of displacement matrix f. In (a), SEM image of the calibration target. Image (b) shows the three-dimensional Ewald cap of calibration target, which features 4 discontinuities. In a measurement, the discontinuities are displaced according to (c) for the case of sample rotation, and according to (d) for illumination tilt.

FIG. 25=Table 1 (Results of angle measurements) and referred to as "Tab. 1" throughout the specification.

FIG. 26=Table 2 (Results of the fit of experimental data) and referred to as "Tab. 2" throughout the specification.

FIG. 27=Table 3 (Results of peak-to-peak distance measurements) and referred to as "Tab. 3" throughout the specification.

TABLES

Table 1: Results of angle measurements of experimental data for λ=532 nm and $NA_{eff}$=0.83.

Table 2: Fit of the APSF model of the complex field of the measured single nanohole and from which the Synthetic Coherence transfer function can be computed: Results of the fit of experimental data from optical system at λ=532 nm and NA=0.95.

Table 3: Results of peak-to-peak distance measurements of the test target at λ=532 nm and NA=0.95. The standard precision is based on the lateral sampling of 56 nm, the complex deconvolution is determined in FIG. 7 (a)-(d).

3 DETAILED DESCRIPTION OF THE INVENTION

For the first time to our knowledge, it is demonstrated in the present invention that a method based on the information content available from the phase as well as from the amplitude of the complex field scattered by the observed specimen, can deliver super-resolution microscopic images of a specimen, i.e. images with a resolution beyond the Rayleigh limit of the microscope. These assertion is demonstrated by developing the theory and giving the experimental evidence that such a resolution improvement can be achieved on an optical microscope specially adapted or modified to measure the complex wavefield of the wave radiated by the specimen, and where the wavefront is reconstructed according to the any methods developed to achieve quantitative phase microscopy: defocused imaging, modified DIC, Shack-Hartmann wavefront analyzer or any analyzer derived from a similar principle, such as multi-level lateral shearing interferometers or common-path interferometers, or devices that convert stacks of intensity images (transport intensity techniques: TIT) into quantitative phase image, provided that the said quantitative phase microscopy deliver a comprehensive measure of the complex wavefield scattered by the specimen.

The theory of wave optics and frequency analysis of imaging systems teaches that coherent and incoherent imaging systems behave differently. One simple attribute of image properties is the frequency spectrum $$k_{c,incoh} = 2k_{c,coh}, \quad (1)$$

which allows the double frequency for an incoherent system compared to the coherent counterpart. Furthermore, the frequency transmission is differently shaped, triangle-like for incoherent and square-like for coherent case. The respective shape results in better imaging contrast for coherent systems and a smaller limit of resolution for the incoherent counterpart. The limit of resolution according to Rayleigh's criterion of resolution is given by:

$$d_{min} = \alpha \frac{\lambda}{NA}, \quad (2)$$

with $\alpha_{coh} = 0.82$ and $\alpha_{incoh} = 0.61$.

The proposed method consists of three major steps. First, for inverse filtering the three-dimensional deconvolution of complex fields is formalized by complex noise filtering. Secondly, based on single hologram reconstruction, an experimental filter function is defined. Third, in a rigorous approach the filtered field is used to retrieve the scattered object function.

For a coherently illuminated imaging system, the 3D image formation of the complex field U is expressed as the convolution of the complex object function, called o, and the complex point spread function (APSF), called h:

$$U(\vec{r}_2) = \iiint_{-\infty}^{\infty} o(\vec{r}_1) h(\vec{r}_2 - \vec{r}_1) dx_1 dy_1 dz_1, \quad (3)$$

where r=(x, y, z) denotes the location vector which yields for the object space $r_1$ and the image space $r_2$. Equation (3) can be recast into reciprocal space by a 3D Fourier transformation F defined as:

$$\mathcal{F}\{U(\vec{r}_2)\} = \iiint_{-\infty}^{\infty} U(\vec{r}_2) \exp[i2\pi(\vec{k} \cdot \vec{r}_2)] dx_2 dy_2 dz_2. \quad (4)$$

The reciprocal space based on the free-space (n=1) norm of wavenumber k with wavelength λ relates to spatial frequency ν and wave vector $k=(k_x, k_y, k_z)$ by $$k = |\vec{k}| = 2\pi \nu = \frac{2\pi}{\lambda}. \quad (5)$$

According to the convolution theorem, applying (4) to Eq. (3) results in:

$$\underbrace{\mathcal{F}\{U(\vec{r}_2)\}}_{G(\vec{k})} = \underbrace{\mathcal{F}\{o\}}_{O(\vec{k})} \underbrace{\mathcal{F}\{h\}}_{c(\vec{k})}. \quad (6)$$

Conventionally, the 3D Fourier transform of U, o, and h are called G, the complex image spectrum, O, the complex object spectrum, and, c, the coherent transfer function (CTF). The later is bandpass limited through h, with the maximal lateral wave vector, $$k_{xy,c} = k \sin \alpha \quad (7)$$

and the maximal longitudinal wave vector $$k_{z,c} = k(1 - \cos \alpha). \quad (8)$$

The angle α indicates the half-angle of the maximum cone of light that can enter to the microscope objective (MO) given by its NA=ni sin α (ni is the immersion's index of refraction). Through Eq. (6), the complex image formation can be easily inverted:

$$o(\vec{r}_1) = \iiint_{-\infty}^{\infty} O(\vec{k}) \exp[-i2\pi(\vec{k} \cdot \vec{r}_1)] dk_x dk_y dk_z = \mathcal{F}^{-1}\left\{\frac{G(\vec{k})}{c(\vec{k})}\right\}. \quad (9)$$

The three-dimensional inverse filtering can be performed directly by dividing the two complex fields of G and c. As known from intensity deconvolution, the inverse filtering method in the complex domain suffers from noise amplification for small values of the denominator of G(k)/c(k), particularly at high spatial frequencies.

As stated by Eq. (4), the recorded spectrum G(k) is physically band limited by the CTF, thus it can be low-pass filtered with the maximal frequency $k_{xy,c}$ of Eq. (7) in order to suppress noise. However, small amplitude transmission values within the band-pass of the 3D CTF may still amplify noise. The noise amplification results in peak transmission values in the deconvolved spectrum, which add very high modulations in phase. Thus, phase information could be degraded through amplitude noise. To reduce noise degradation effectively we propose a threshold in the 3D CTF of Eq. (7), such as:

$$\tilde{c}(\vec{k}) = \begin{cases} c & \text{if } |c| > \tau \\ 1 \cdot \exp[i \cdot \arg[c]] & \text{if } |c| \leq \tau. \end{cases} \quad (10)$$

For modulus of c smaller than τ, the CTF's amplitude is set to unity, so that its degrading amplitude influence is eliminated while its complex value still acts for the deconvolution. By controlling τ, truncated inverse complex filtering (τ<<1) or pure phase filtering (τ=1) can be achieved. Therefore, the deconvolution result depends on the parameter τ. Compared to standard regularization 3D intensity deconvolution, the threshold acts similar to regularization parameter in amplitude domain while the complex valued domain is unaffected.

Typically, the 3D image of a specimen is acquired from a series of 2D images by refocusing the MO at different planes of the ensemble structure [9]. In the proposed technique, however, the complex fields are provided by digital holographic microscopy (DHM) in transmission configuration. Thus, the amplitude $A(r)$ as well as the phase $\Phi(r)$ of the hologram $\Psi$ can be reconstructed by convolution:

$$U(\vec{r}_2) = A(\vec{r}_2) \cdot \exp[i\Phi(\vec{r}_2)] \qquad (11)$$
$$= \frac{\exp(ikd_{z_2})}{id'\lambda} \int\int_{-\infty}^{\infty} \Psi(x'_2, y'_2) \exp\left[\frac{i\pi}{d_{z_2}\lambda}[(x'_2-x_2)^2+(y'_2-y_2)]^2\right] dx'_2 dy'_2,$$

where $r_2'$ is a spatial coordinate in the hologram plane as summarized in FIG. 17, and d the hologram reconstruction distance. Using digital refocusing, a pseudo 3D field can be retrieved by varying the reconstruction distance $d_z = d + M^2 z_1$ scaled by the MO's longitudinal magnification of $M^2 = (f/f')^2$.

The coherent imaging system can be experimentally characterized by a complex point source. It consists of an isolated nano-metric aperture ($\approx 75$ nm) in a thin opaque coating on a conventional coverslip. The aperture is fabricated in the Center of MicroNano-Technology (CMI) clean room facilities by focused ion beam (FIB) milling directly in the evaporated aluminum film (thickness=100 nm). For a single point object $o(r) = \delta(r)$, the image field $U(r)$ is the APSF $h(r)$. This approximation yields for aperture diameters $\ll d_{limit}$ it of resolution, and its imaged amplitude and phase have been shown to be characteristic.

The coverslip is mounted on a custom diffraction tomography microscope based on sample rotation and transmission DHM. The sample rotation by $\theta$, introduces non-design MO conditions of imaging. In order to demonstrate the importance of the proposed technique to diffraction tomography by sample rotation, experimental holograms are recorded for tilt positions as well.

The dependence of the APSF's amplitude $A_\delta$ and phase $\Phi_\delta$ on the sample rotation is defined by $$h_{\vec{k}_0}(\vec{r}_2) = A_{\delta,\vec{k}_0}^{(s)}(\vec{r}_2) \cdot \exp[i\Phi_{\delta,\vec{k}_0}^{(s)}(\vec{r}_2)], \qquad (12)$$

with illumination $k_0 = (k_{0,x}, k_{0,y}, k_{0,z})$ in the laboratory reference frame, meaning relative to the optical axis. In the demonstrated case of sample rotation, $k_0' = (0,0,1)$ relative to the optical axis does not change. However, the illumination relative to the sample does change and the incident field vector can be expressed as $k_0 = (0, \sin\theta, \cos\theta)$ in the sample frame of reference.

Note the complex-point source technique allows registering the scattered h without mixing up of background illumination. As a result, the SNR is advantageous and the required h can be directly used. Thus, the amplitude and phase of the recorded field $A(r)$ and $\Phi(r)$ corresponds to the scattered components $A^{(s)}(r)$ and $\Phi^{(s)}(r)$.

Alternatively, the APSF can be synthesized by a theoretical description. A synthetic h for high-aperture systems can be approximated by the scalar Debye theory expressed in a spherical coordinate system of $\theta$ and $\phi$ within the object space $$\begin{cases} x_1 = f\sin\theta\cos\phi, \\ y_1 = f\sin\theta\sin\phi, \\ z_1 = -f\cos\theta, \end{cases} \qquad (13)$$

which satisfies $$f^2 = x_1^2 + y_1^2 + z_1^2,$$

and thus a polar coordinate system within the image space originating in focus $$\begin{cases} x_2 = r_2\cos\Psi, \\ y_2 = r_2\sin\Psi, \\ z_2, \end{cases} \qquad (14)$$

which satisfies $$r_2^2 = x_2^2 + y_2^2.$$

The Debye integral results:

$$U_\delta(r_2, \Psi, z_2) = \frac{i}{\lambda} \int_0^{2\pi} \int_0^\alpha P(\theta,\phi) \qquad (15)$$
$$\exp[-ikr_i\sin\theta\cos(\phi-\Psi) - ikz_2\cos\theta - ik\Phi(\theta,\phi)]\sin\theta d\theta d\phi,$$

where $P(\theta,\phi)$ is the apodization function and $\Phi(\theta,\phi)$ the aberration function. Generally, the sine condition holds for an aplanatic imaging system within the field of view $$P(\theta,\phi) = \sqrt{\cos\theta}. \qquad (16)$$

Aberrations in high aperture $\Phi(\theta,\phi)$ may be developed as spherical harmonics in a complete orthogonal set and are included in our model for the primary aberrations. The 2D APSF affected by aberration can be calculated at a certain distance $z_2$ relative to the focal plane $$h(z_2) = \iint U_d(r_2, Y, z_2) dr_2 dY. \qquad (17)$$

If the incident illumination field on the scatterer is in direction $k_0$ and the scattered field is measured in direction of k, the first-order Born approximation states that the 3D CTF is given by the cap of an Ewald sphere which yields for $$\vec{K} = \vec{k} - \vec{k}_0, \qquad (18)$$

The NA determines this complete sphere, so that only part of the diffracted light can be transmitted. The experimental DHM's 3D CTF can be directly calculated.

From this reconstruction, the NA can be directly measured by the subtended half-angle $\alpha$ according to the cut-off frequencies. Moreover, the experimental CTF do not only feature NA cutoff but also include intrinsically experimental conditions such as aberrations. Due to the sample rotation, higher frequencies are accepted on one side of the aperture, while frequencies are cut on the opposed side. As a result, the CTF is displaced along the Ewald's sphere. Note that this displacement is a combination of translation and rotation if the rotational center does not coincident with the sample geometrical center.

Thus, the 3D CTF can be written as a function of the $$c(\vec{k}-\vec{k}_0) = \hat{A}_\delta^{(s)}(\vec{k}-\vec{k}_0) \cdot \exp[i\hat{\Phi}_\delta^{(s)}(\vec{k}-\vec{k}_0)], \qquad (19)$$

where the symbol $\hat{}$ indicates the Fourier component in amplitude A and phase $\Phi$. Similarly to the 3D CTF reconstruction, the three-dimensional complex spectrum $G(K)$ is calculated.

In the case of transmission microscopy, the APSF is not directly convolved with the complex object function o. According to diffraction theory, the total field o can be expressed as the sum of the incident field $o^{(i)}$ in direction of $k_0$ and the scattered field $o^{(s)}$, $$o_{\vec{k}_0}(\vec{r}_1) = o_{\vec{k}_0}^{(i)}(\vec{r}_1) + o_{\vec{k}_0}^{(s)}(\vec{r}_1), \quad (20)$$

where $$o_{\vec{k}_0}^{(s)}(\vec{r}_1) = A_{\vec{k}_0}^{(s)}(\vec{r}_1) \cdot \exp[i\Phi_{\vec{k}_0}^{(s)}(\vec{r}_1)], \quad (21)$$

with scattered field amplitude $A^{(s)}(r)$ and phase $\Phi^{(s)}(r)$.

On substituting into $k_0$ we see that the coherent deconvolution satisfies the equation $$\mathcal{F}\{o_{\vec{k}_0}^{(s)}(\vec{r}_1)\} = \frac{G(\vec{k}-\vec{k}_0) - \mathcal{F}\{\int\int\int_{-\infty}^{\infty} o_{\vec{k}_0}^{(i)}(\vec{r}_1) h_{\vec{k}_0}(\vec{r}_2-\vec{r}_1) dx_1 dy_1 dz_1\}}{c(\vec{k}-\vec{k}_0)}. \quad (22)$$

The subtracted convolution term in the numerator can be identified as the reference field of an empty field of view. Suppose that the field incident on the scatterer is a monochromatic plane wave of constant amplitude propagating in the direction specified by $k_0$. The time-independent part of the incident field is then given by the expression $$o_{\vec{k}_0}^{(i)}(\vec{r}_1) = A^{(i)} \cdot \exp[i\vec{k}_0 \vec{r}_1], \quad (23)$$

On the other side, according to former Equations, the image spectrum may be expressed as $$G(\vec{k}-\vec{k}_0) = \hat{A}(\vec{k}-\vec{k}_0) \cdot \exp[i\hat{\Phi}(\vec{k}-\vec{k}_0)] = \quad (24)$$

$$\begin{cases} \hat{A}^{(s)}(\vec{k}=\vec{k}_0) + \hat{A}^{(i)} & \text{if } \vec{k} = \vec{k}_0 \\ \hat{A}^{(s)}(\vec{k}-\vec{k}_0) \cdot \exp[i\hat{\Phi}(\vec{k}-\vec{k}_0)] & \text{if } \vec{k} = \vec{k}_0, \end{cases}$$

as shown in FIG. 18 and it follows $$\mathcal{F}\{o_{\vec{k}_0}^{(s)}(\vec{r}_1)\} = \frac{\hat{A}^{(s)}(\vec{k}-\vec{k}_0) \cdot \exp[i\hat{\Phi}(\vec{k}-\vec{k}_0)]}{\hat{A}_\delta^{(s)}(\vec{k}-\vec{k}_0) \cdot \exp[i\hat{\Phi}_\delta(\vec{k}-\vec{k}_0)]}. \quad (25)$$

and $$\mathcal{F}\{o_{\vec{k}_0}^{(s)}(\vec{r}_1)\} = \frac{G(\vec{k}-\vec{k}_0) - \hat{A}^{(i)}\delta(\vec{k}-\vec{k}_0)}{c(\vec{k}-\vec{k}_0)}. \quad (26)$$

Finally, the means of $A^{(s)}$ can be normalized, so to equalize their spectral dynamic ranges. However, in order to avoid any degradation of the image spectrum by direct subtraction, $o^{(s)}$ can alternatively be calculated by:

$$\mathcal{F}\{o_{\vec{k}_0}^{(s)}(\vec{r}_1)\} = \frac{G(\vec{k}-\vec{k}_0)}{\mathcal{F}^{-1}\{h_{\vec{k}_0}(\vec{r}_1) + o_{\vec{k}_0}^{(i)}(\vec{r}_1)\}} = \quad (27)$$

$$\frac{\hat{A}(\vec{k}-\vec{k}_0) \cdot \exp[i\hat{\Phi}(\vec{k}-\vec{k}_0)]}{\hat{A}_\delta^{(s)}(\vec{k}-\vec{k}_0) \cdot \exp[i\hat{\Phi}_\delta(\vec{k}-\vec{k}_0)] + \hat{A}^{(i)}\delta(\vec{k}-\vec{k}_0)}.$$

In summary, the scattered field $o^{(s)}$ can be obtained for any illumination and with an experimental reference field by Eq. (22) or alternatively under the assumption of plane wave illumination by Eq. (26)/Eq. (27).

We compare this result to Fourier diffraction theorem:

$$\mathcal{F}\{F_{\vec{k}_0}(\vec{r}_1)\} = \frac{i}{\pi} k_z \mathcal{F}\{U_{\vec{k}_0}^{(s)}(x_1, y_1, z_1 = z^\pm)\} \exp[\mp i k_z z^\pm]. \quad (28)$$

It states that the scattered field $U^{(s)}$, recorded at plane $z\pm$, is filtered by an ideal Ewald half sphere (nm: refractive index of mounting medium), and propagated by the latest term as known by the filtered back propagation algorithm of conventional diffraction tomography. In our case, by division through the 3D CTF, the spectrum is inverse filtered by the experimental Ewald sphere. Moreover, the field propagation is intrinsically included through z-dependent pre-factor in the reconstruction. Therefore, it may be approximated as $$\mathcal{F}\{F_{\vec{k}_0}(\vec{r}_1)\} = \frac{i}{\pi} \mathcal{F}\{o_{\vec{k}_0}^{(s)}(\vec{r}_1)\}. \quad (29)$$

The main difference consists in the filter function. A priori, the experimental CTF is better acquainted since its intrinsically corrects for diffraction, aberration and non-design imaging conditions. A multiplicative filter does not correct for aberrations, but only passes frequencies on the Ewald sphere. In order to achieve a pass filter and experimental correction the fields must be divided. The function $F(K)$ is the 3D Fourier transform of the scattering potential derived by the inhomogeneous Helmholz equation of the medium $$n(\vec{r}_1) = [n_m^2 - F_{LB}(\vec{r}_1)/k^2]^{1/2}, \quad (30)$$

and n(r) is the complex refractive index. The real part of Eq. (30) is associated with refraction while its imaginary part is related to absorption.

If one were to measure the scattered field in the scattered field in the far zone for all possible directions of incidence and all possible directions of scattering one could determine all those Fourier components $F(K)$ of the scatting potential within the full Ewald limiting sphere of $2k=4\pi/\lambda$. One could synthesize all these Fourier components to obtain the approximation $$F_{LB}(\vec{r}_1) = \frac{1}{(2\pi)^3} \int\int\int_{\vec{K}\leq 2k} \hat{F}'(\vec{K}) \exp[i\vec{K}\vec{r}_1] dK_x dK_y dK_z. \quad (31)$$

called the low-pass filtered approximation to the scattering potential that gives rise to diffraction tomography. It is crucial, though, to orient each component $F(K)$ correctly in the reciprocal space to achieve a super-resolved object reconstruction. For this purpose, we suggest to calibrate the shift respectively rotation of the CTF for each configuration of $k_0$ so that:

$$\hat{F}(\vec{K}-\vec{K}_0) = f_{\vec{k}_0}(d_x, d_y, \theta, \gamma) \hat{F}'(\vec{K}-\vec{K}_0), \quad (32)$$

where the displacement matrix (translation and rotation) $f_{k_0}$ $(d_x, d_y, \theta, y)$ is calibrated with a novel experimental technique that yields for arbitrary illumination or sample rotation as defined and illustrated in FIG. 24.

It shows that the exact translation of the CTF can be measured by the shift of constant cross-pattern of the calibration target, such as $$f_{\vec{k}_0, d_x, d_y} = d_{x,y}' - d_{z,y}. \tag{33}$$

Similarly, a dilation of the cross-pattern is related to rotation:

$$f_{\vec{k}_0, \gamma} = \cos^{-1}\left(\frac{d_x}{d_x'}\right), \tag{34}$$

$$f_{\vec{k}_0, \theta} = \cos^{-1}\left(\frac{d_y}{d_y'}\right), \tag{35}$$

Thus, the system can be calibrated for each configuration of $k_0$ giving rise to the calibrated reconstruction of the scattering potential:

$$F_{LB}(\vec{r}_1) = \frac{1}{(2\pi)^3} \int\int\int_{K \leq 2k} f_{\vec{k}_0}^{-1} \hat{F}(\vec{K}) \exp[i\vec{K}\vec{r}_1] dK_x dK_y dK_z. \tag{36}$$

The experimental evidences that the proposed approach, based on previously given assertions, rely on the realization of physical specimens according to the goals pursued by the invention. The recourse to nano-holes is part of the invention: Instead of pinholes, nano-metric apertures ($\varnothing_{nominal}$=80 nm) are drilled with focused ion beam (FIB) in a thin metallic aluminum film (100 nm) deposited on glass. Single and multiple optical sources can be realize with this technique. Pairs of sources have been placed at very close distances d, smaller than the limit of resolution. The distance is controlled and measured by scanning electron microscopy (SEM), as shown in FIG. (1).

Using a single nano-metric aperture as point source, the APSF can be measured experimentally and quantitatively. In this approach, the complex field can be accessed by using a quantitative phase microscope: in the present disclosure, digital holographic microscopy (DHM) has been used in transmission configuration. From the measure of the complex field of the wave radiated by a single nanohole, the complex experimental CTF can be computed and will provide the necessary data for the determination of the parameters of the SCTF. The effective numerical aperture $NA_{eff}$ is determined from the phase image of a single nano-metric aperture ($\varnothing_{real}$>>85 nm) placed on the test target and will be used for the clarity of the method.

In order to demonstrate the capability of the disclosed method to improve the resolution beyond the Rayleigh limitations, the amplitude as well as the phase of the complex field emitted by two closely spaced nano-holes have been extracted by any of the previously mentioned microscopy methods capable of giving a complex field image of the two holes specimens. In the present demonstration, DHM technique has been used in transmission. The results are shown in FIG. 2 and will be commented in the following.

In a first embodiment, the invention teaches how the experimental observation of systematically occurring phase singularities in phase imaging of sub-Rayleigh distanced objects can be exploited to relate the locus of the phase singularities to the sub-Rayleigh distance of point sources, not resolved in usual diffraction limited microscopy.

The images show the amplitudes (cf. FIG. 2 (*a, c, e*)) of two PSF beneath the coherent limit of resolution ($d_{min,exp}$=526 nm for a NAeff=0.83.). It can be seen that the two PSF converge and cannot be distinguished anymore by the contrast criterion. Accordingly, the phase images (cf. FIG. 1 (*b, d, f*)) show the superposition of the known concentric interference pattern of the PSF. The concentric phase pattern is the result of a spherical wave varying from $-\pi$ to $\pi$. This superposition results in the generation of lines of phase singularities observed for the first time to our knowledge. It turns out that the direction of those lines of singularities varies systematically with the center to center (ctc)-distance of the two holes, as can be seen by comparing FIG. 2 (b,d,f).

The lines of phase singularities can be explained as the result of an interference phenomenon. The spherical waves emitted from each nano-hole intercept mutually and create destructive interferences at the positions where $\Delta\Phi=\pi$.

Especially in FIG. 2(*b*) the convergence of out of phase wavefronts results in singularities, which can be very well observed. The phase arrangement in the focal image plane is schematically illustrated in FIG. 3 that shows the circles of equal phases with $\pi$ spacings.

A total of four destructive interferences are possible for the two commutable pairs of rings, which explains the observations of FIG. 2. The spacing s between two out of phase circles with radii $r_1$=r and $r_2$=r+s can be calculated by $$s = \frac{\Delta\Phi}{k_{max}} = \frac{p}{(2p/l)NA} = \frac{l}{2NA}, \tag{37}$$

with the maximal spatial frequency $k_{max}$ allowed by NA. Applying Pythagoras to the interception point's triangle results in $$x^2 + (a/2)^2 = r_2^2 \text{ and } (x-d)^2 + (a/2)^2 = r_1^2, \tag{38}$$

according to FIG. 3. Furthermore, the angle $\theta$ relative to the symmetry axis is given by the following trigonometric relation $$\tan\theta = \frac{x - d/2}{a/2}. \tag{39}$$

Combining the geometrical relations and solving it for d results in $$d(\theta, r, s) = \{2r^2 + 2rs + s^2 - [4r^2(r+s)^2 - s^2(2r+s)^2 \cot^2\theta]^{1/2}\}^{1/2}. \tag{40}$$

This equation describes how to deduce a ctc-distance in dependence of the lines of singularities' angle $\theta$ and the spacing s characteristic to the imaging system. The parameter r describes the dependence of $\theta$ of the order of the equal phase circle: for higher order rings $\pi$ will be smaller than for lower orders of the same distance d. Therefore strictly speaking the line of singularities is bent. To quantify this effect, Eq. (40) is plotted in FIG. 4. for different r and d values.

The plot shows that the curvature is strongest for big distances d. However, the curvature (represented in light grey in FIG. 4.) decreases asymptotically for smaller distances and becomes negligible. Furthermore, the scheme in FIG. 4. suggests that $\theta$ can maximally reach $\pi/2$. The minimal deducible distance therefore given for the maximal angle of $\theta$ is $$\theta_{max} = \theta/2 \Rightarrow d_{min} = s. \tag{41}$$

This equation states a new limit of resolution based on an adapted coherent resolution criterion. It results in resolvable distance of minimal spacing 1.64 smaller than suggested by Eq. (2) and even 1.24 superior to the corresponding equation for the incoherently illuminated case. To test this hypothesis and to verify it, we have measured θ directly from the experimental results shown in FIG. 2. (600 nm distanced nano-hole couple not illustrated).

The results are summarized Tab. 1. $\theta_i$ is measured as a function of $r_i$ for several phase contours (N=12) with a reading precision $\Delta\theta_i$ for each ctc-distance. The associated hole distances $d_i$ are calculated by Eq. (40) and their uncertainties $s_{d,i}$ are determined according to the error propagation of $\Delta\theta_i$. Tab. 1 indicates the mean values with a precision of the error in the mean. Therefore, $\overline{\Delta\theta}$ indicates the visibility of the phase singularities whereas $\overline{s_d}$ shows how much the deduced distance is sensitive to variations of θ.

According to the uncertainties of $\overline{d}$, the precision reaches laterally >>24 nm. The 300 nm measurement, though, is just beneath the limit of resolution in phase given by Eqs. (24) and (20). As seen in FIG. 2.(f) the four singularities' lines are merged to two and result in $\theta=\pi/2$. The smearing out ($\overline{\Delta\theta}=\pm10°$) of the phase singularity in FIG. 2.(f) can be interpreted as the visual limit of resolution in phase where the unique orientation of the singularity is lost. Consequently, the distance can be estimated to be 320 nm or smaller.

In FIG. 4, all experimental results of Tab. 1 are compared to the theoretical d-Θ-relationship according to Eq. (40). The deduced distances $\overline{d}$ are found to match well with the real ones. Vice versa, the measured angles overlap with the associated θ of the real distances. The asymptotic behavior of the theoretical curve explains the trend of $\overline{s_d}$ to become more accurate for bigger angles. However, this advantageous sensitivity is partially compensated by an opposed trend of $\overline{\Delta\theta}$, i.e. the singularities become less prominent for decreasing distances d. Moreover, a curvature of the lines of singularities is not visible in FIG. 2.(b,d) since $\overline{\Delta\theta}$ is bigger than the variation due to the r dependence (cf. FIG. 4. light grey). Finally, the assumption of constant s may augment $\overline{s_d}$ if $NA_{eff}$ is affected by asymmetric aberrations, e.g. coma or astigmatism, which can be seen in FIG. 2.(b,d,f) as small variations of s in different directions.

The demonstrated theoretical consideration is based on the assumption that each sub-Rayleigh object acts as a spherical wave emitter accordingly to Huygens' principle. In the classical imaging formalism for incoherent light, those emitters do not interact and are simply imaged as an ensemble of PSF. Nonetheless, the coherent imaging bears the capability of recovering such intrinsic cross-talk. In this aspect, the observation of singularities can be seen as a variant of structured illumination microscopy (SIM) where the structured illumination results from the sample properties itself. The enhanced limit of resolution given by linear structured illumination is consequently comparable.

In conclusion, the observation of intrinsic interference phenomena in coherent imaging of sub-Rayleigh distances has been presented. The destructive interference appears as lines of singularities in phase and their orientations have been shown to be related to the distances between the point-like objects. The correctness of deduced Eq. (40) is endorsed by matching the angles of singularity lines with experimental distances d. This method suggests a new resolution criterion in phase opposed to the contrast-based Rayleigh's criterion. The limit of resolution with coherent illumination is extended by a factor of 1.64.

In a second, preferred embodiment, the disclosed method teaches how the image resolution is improved by complex deconvolution. Accessing the object's scattered complex field—containing the information coded in the phase—and deconvolving it with the reconstructed complex transfer function (CTF) is at the basis of the disclosed method. It is taught how the concept of "Synthetic Coherent Transfer Function" (SCTF), based on Debye scalar or Vector model includes experimental parameters of MO and how the experimental Amplitude Point Spread Functions (APSF) are used for the SCTF determination. It is also taught how to derive APSF from the measurement of the complex field scattered by a nano-hole in a metallic film.

By adapting mentioned deconvolution post processing to coherent illumination images obtained from any of the above mentioned phase microscopy techniques adapted to provide complex field determination, the phase imaging process does not need to be compromised and no additional optical components are required since the method is applied at a step posterior to the physical imaging process itself. We also show that the usual trade-off between precision in object localization and Rayleigh's resolution criterion can be overcome by the presented method.

To demonstrate the effectiveness of complex deconvolution, and in a similar way to the technique disclosed in the first embodiment of the invention, a test target consisting of a thin opaque aluminum film (thickness=100 nm) on a conventional coverslip is used. Nano-metric apertures ($\varnothing_{nominal}=80$ nm) are drilled with focused ion beam (FIB) in the coating and are placed at very close pitches η. The fabricated pitch is controlled and measured by scanning electron microscopy (SEM), as shown in FIG. 1.

The SEM measurements of the diameter reveal marginally bigger diameters ($\varnothing_{real}>90$ nm) than the nominal ones due to their slightly conical shapes. Whereas, the real pitch h varies only within ±5 nm from the nominal ones.

The single nano-metric aperture can serve as experimental complex point source for $h_{exp}$ and its imaged amplitude and phase is captured and analyzed as indicated previously in order to establish the SCTF.

The differently pitched double hole series (cf. FIG. 1) serve as experimental test targets for establishing the values of U. The light source is a YAG laser $\lambda=532$ nm. The used microscope objective is a Zeiss x63 NA0.95 in air ($n_i=1$) in combination with a relay magnification to reach a lateral sampling of dx=56 nm.

The complex field is provided by digital holographic microscopy (DHM) in transmission configuration. The validity of the demonstration is not dependent on the instrument used to establish the complex field data and could be any of the phase microscope listed previously. Thus, the amplitude A(x,y) as well as the phase F(x,y) of the complex field emitted by nano-holes can be extracted by following the methods of which is expressed as $$U(x,y)=\alpha_n A(x,y)\exp(i\Phi(x,y)),$$

$$\text{and } I(x,y)=|U(x,y)|^2, \quad (42)$$

where $a_n$ is a real normalization constant.

DHM's feature of digital refocusing is used to propagate the recorded holograms in the focal plane from which the CTF can be calculated. The reconstructed experimental CTF of the single aperture is called $c_{exp}$ and is illustrated in FIGS. 5(a) and (c).

The modulus of $c_{exp}$ describes the dependence of the system's transmittance on dependence of frequency. The high value for the transmittance of the carrier wave (seen for $|c_{exp}(k_x=0, k_y=0)|$), i.e. the background brightness of the image, is specific to the DHM's dynamic range, which reaches from zero to the sum of the reference and object wave intensities.

The phase of the transmitted wavefronts are shown respectively in part (c) and (d) of FIG. 5. In the focal plane, the representation of the wavefront in the k-space results in the phase of the focal spot image. Vice versa, defocusing results in de-phasing of the transmitted wavefront's wave. The effects of aberrations on the system can be seen similarly as the coma like deformation of the wavefront phase in FIG. 5(c).

To ensure optimal optical imaging conditions the effective system's NA must be estimated from the experimentally reconstructed CTF. The effective NA relates to the discrete spectral support as $$NA = \frac{n_i \lambda}{N dx} m_{px}, \tag{43}$$

with squared recording zone of N×N pixels, with uniform lateral sampling dx. $m_{px}$ corresponds therefore to the discrete spatial bandwidth of the microscope objective. The axes of FIG. 5 are recast into k-space and the effective NA can be directly read out to be in accordance with the nominal one.

The complex deconvolution process by the experimental CTF: $c_{exp}$ ought to be compared to a reference system. This system is based on a synthetic CTF: SCTF. $c_{syn}$ transformed from a synthetic APSF. The APSF represents a synthesis since the scalar Debye theory is computed with experimentally assessed parameters of the optical imaging system.

In order to model correctly the aberration-affected system, the coefficients $A_{n,m}$ of the aberration function $\Phi$ have to be adapted in a fitting process. In this optimization process, each calculation of the synthetic APSF is performed by FFT of the pupil function. For the critical angle of the imaging system of NA=0.95, the vectorial Debye model would be more appropriate since it describes polarization dependent effects. However, for the computation intensive fitting procedure, the faster scalar model is chosen.

As already pointed out, the aberration will affect most prominently the phase of the CTF. Therefore the fitting process is performed in the phase domain and compares the experimental data with the synthetic phase CTF in a error function $f$:

$$f(A_{n,m}) = \sum_{k_x, k_y} |\arg[c_{exp}] - \arg[c_{syn}(A_{n,m})]|, \tag{44}$$

where the synthetic model $c_{syn}$ is a function of the spherical harmonics with amplitude factor $A_{n,m}$. The global minimum of $f$ is found by a genetic algorithm and the fine fitting is performed by pattern research. The results are listed in Tab. 2.

The APSF synthesized with the parameters from Tab. 2 is shown in FIGS. 5(b) and (d). The modulus spectra show the same transmittance values and the bandwidth's size is matched. The most prominent difference consists in an asymmetry favoring negative $k_x$ frequencies and therefore a direction dependent effect. The model does not include direction dependent intensity responses, which would be suggested by a vectorial influence.

On the other side, the phase part of the fitted spectrum in FIG. 5(d) shows a good agreement with the experimental one in (c). Since the experimental phase CTF was fitted, the scalar model manages to create a similar wavefront which does not affect the modulus. In reality, though, the direction dependent transmittance, seen in FIG. 5(a), is connected to its phase in part (c). Consequently, the estimated spherical harmonics' prefactors $A_{n,m}$ are likely to be overestimated.

The synthetic CTF allows modeling a synthetic test target corresponding to the experimental test target depicted in FIG. 1

$$U_{syn} = h_{syn}(x, y_1) + h_{syn}(x, y_2), \tag{45}$$

in such a way that $h=|y_1-y_2|$. Most importantly, $U_{syn}$ and $c_{syn}$ serve as a reference system to determine the influence of noise on the deconvolution process. Without losing any generality, noise can be added to the synthetic APSF as a Gaussian probability distribution $n_g$ and yields the estimation of $U_{noise}$ by computing Eq. (45).

The fields of the test target have been recorded for all $\eta$ of FIG. 1 and processed according to the procedure indicated in a previous section. As an illustration, FIGS. 6(a) and (b) ($\eta=400$ nm) show the complex field spectrum $\tilde{G}$ calculated by Fourier transforming the reconstructed complex image field U.

The amplitude $|\tilde{G}|$ in FIG. 6 shows the image spectrum accompanied by two frequency filters (seen as minimum transmittance) in $k_y$ direction. These minimum transmittance filters can be understood as the spectral presentation of the destructive interference between the waves emitted by the two holes, reported as phase singularities. The discontinuities in $\arg[\tilde{G}]$ (cf. FIG. 6(b)) occurs at spatial positions where the spherical waves emitted from each hole are out-of-phase. The orientation angle $\theta$ of those lines of singularities varies systematically with pitch $\eta$ of the two holes. Consequently, the $\eta-\theta$ relationship corresponds closely to a $\eta-k_y$ relationship meaning that the position of the transmittances minima varies again as a function of the pitch. FIG. 6(c) illustrates the behavior at the bandwidth $k_c$: the falloff of the CTF is not a sharp discontinuity but is much more gradual. The gradual falloff appears systematically for all image spectra of different pitches $\eta$ (cf. FIG. 6(c)). It can be seen that the minimum position of the filter shifts to higher frequencies as $\eta$ increases. Finally, for $\eta=300$ nm, the minimum almost reaches $k_{y,c}$ and $|\tilde{G}|$ does barely feature the falloff edge.

The exact maximally possible shift of the minimum transmittance in FIG. 6(c) matches with the biggest observable angle $\theta$ of the phase singularities. The according limit of resolution is derived to be $$d_{min}^{cd} = \frac{\lambda}{2 NA}. \tag{46}$$

Note that $d^{cd,min}$ correspond to a minimal distance 1.64 smaller than suggested by Eq. (2) for the coherent case and still 1.24 superior to the corresponding equation for the incoherently illuminated case.

Similarly, the spectra $|\tilde{J}|$ are compared with the experimental OTF in FIG. 6(d). The experimental OTF has a shape boosting the relative importance of midrange and high frequencies, while diminishing the strength of low frequencies. Here, the filtering effect can be recognized as smoothed frequency wiggles but with the same trend to shift to higher k values for smaller p. In comparison to the complex spectrum, the high frequencies related to smaller $\eta$ are less importantly weighted. One can observe the cutting of the frequencies which occurs already before $\eta=400$ nm.

The raw images show the intensities I (cf. FIG. 7 inserts 'rw') of two PSF above (a,b) beneath (c,d) the coherent limit of resolution ($d_{min,coh}=460$ nm). It can be seen that the PSF pairs beneath $d_{min,coh}$ converge and cannot be distinguished anymore by the contrast criterion. The inserts labeled 'cd', though, show the intensity image $|o|^2$ complex deconvolved with $k_{max}$ deduced in a previous section. In the profile plot, $|U|^2$ and $|o|^2$ are compared to intensity deconvolved images I along the y-cross sections through the pitch centers. The exact results are listed in Tab. 3.

It shows that both deconvolution methods manage to improve the contrast of the $\eta=500$ nm and $\eta=600$ nm image. The contrast is higher for complex deconvolution whilst holding a more accurate match on the actual pitch $\eta$. For the case of $\eta=400$ nm the intensity deconvolution fails to resolve individual peaks. Despite of being beyond $d_{min,coh}=460$ nm, the coherent deconvolution method results in a correct distance determination within 25 nm while holding a contrast of 69%. However, the deconvolved image suffers from a residual artifact, which is caused by a mismatch during the DHM reconstruction procedure. The final test target measurement of 300 nm lies just at the edge of the new limit of resolution derived in Eq. (46). The peak is clearly observable in the cross-section, however, in the image itself the mentioned DHM reconstruction mismatch causes too many artifacts, so that the two peaks are not clearly recognizable any more.

The choice of correct mask radius $k_{max}$ is crucial to avoid cutting information or adding noise. The mask radius can be chosen based on the minimal structure $d_{min}$ to be resolved which must fulfill at least $k_{max} \leq k_c$. It is not trivial, though, to decide to which extend the filter's diameter can be enlarged.

In order to address this question, the fields of the test target are deconvolved while varying the filter's diameter $k_{max}$ (expressed as the according minimal resolvable distance $d_{min}$ by). Note that the smoothing is fixed to a small value $k_s = 2\pi/(d_{min}-60$ nm). For the results analysis, the deconvolved amplitude fields (cf. FIG. 7) are interpolated and fitted by two Gaussian curves:

$$f(x) = a_1 \exp\left[\frac{(x-m_1)^2}{2b_1^2}\right] + a_2 \exp\left[\frac{(x-m_2)^2}{2b_2^2}\right]. \quad (47)$$

The positions of $m_i$ provide the peak-to-peak (p-t-p) distance of the holes' images. Assuming equivalent transmittance of the imaged holes' pairs, the effective full width at half maximum (FWHM) is averaged for $b_1$ and $b_2$ and determined as $$\text{FWHM} = \sqrt{2\ln 2}(b_1 + b_2). \quad (48)$$

The contrast is calculated by the ratio of the minimum value between the two maxima values of $a_1$ and $a_2$.

The results are shown in FIG. 8 (a-c) for the exemplar case of $\eta=400$ nm. The notation is as following. The legend 'experimental' indicates complex deconvolution of $U_{exp}$ with $c_{exp}$. Contrarily, the legend 'synthetic( ... )' indicates the usage of synthesized fields and CTFs according to a previous section. No noise was added for indication ' ... (no noise)', whereas Gaussian noise was added successively for the indication ' ... (SNR=35)' with the according signal-to-noise ration (SNR). Finally, the case 'experimental-synthetic' represents a hybrid, the complex deconvolution of the experimental fields by the synthetic noise free CTF.

First of all, FIG. 8(a) demonstrates the impact of noise. The bending of the point-to-point curve indicates a dependence of the measured p-t-p distance on $k_{max}(d_{min})$. This trend is strongest for the 'experimental' plot. On the contrary, the fully 'synthetic (noise free)' deconvolution shows a weak dependence, which suggests noise as source of the dependence trend. A stronger bending of the p-t-p curve for smaller $d_{min}$ can be created by adding noise to the 'synthetic(SNR=35)' deconvolution. Vice versa, the 'experimental' dependence becomes weaker for the 'experimental-synthetic' deconvolution but suffers from a vertical upward shift, which may result from modeling mismatch of $h_{syn}$. Eventually, the filter's radius dependence can be partially decoupled by using a noise free synthetic CTF, as expected for the usage of synthetic OTF in intensity deconvolution.

It is in principle desirable to choose the filters' radii as high as possible, in the limit of a 'correct' p-t-p distance. FIG. 8(b) shows a general contrast trend of the deconvolved images, which all cases have in common: the higher the frequency content, the better the contrast. This observation is in accordance with FIG. 8(c) showing clearly the inverse trend of FWHM: peaks become narrower with bigger filter radii. For the 'experimental-synthetic' case the trend of FWHM and contrast is pertubated. At about $d_{min} >> 380$ nm, the trend of increasing contrast is damped (cf. FIG. 8(b)) since the FWHM's trend of narrowing stagnates (cf. FIG. 8(c)). It is most likely that artifacts caused by the modeling mismatch lead to the (trend opposed) broadening.

In our case, we define a precision of ±25 nm (about half dx) of the p-t-p distance as acceptable in order to minimize the FWHM or in other words to maximize the contrast. This error margin is indicated in FIG. 8(d), which shows the p-t-p distances for the 4 'experimental' cases of the test target. According to the defined criterion, it can be seen that an unique filter diameter can be assessed. Moreover, a trend of $k_{max}$ is clearly observable: the optimal filter diameter corresponds to frequencies corresponding roughly to 150 nm±30 beneath the minimal structure $\eta$ to be observed. This trend responds to the hypothesis $k_{max} >> k(\eta-150$ nm) if $\eta < d_{min}$.

The implementations of complex deconvolution are to be discussed in this section. The deconvolved phase spectrum (cf. FIGS. 6 and 9 (b)) appears more even and the phase more continuous in $k_x$ direction. Likewise in amplitude, respectively in FIGS. 6 and 9 (a). The mean deconvolved spectrum transmittance drops down to ~0.6 and therefore appearing to wane. Division, in the frequency domain, by very small values of the CTF gives rise to large transmission values (cf. FIG. 9 (a)). Those 'bad' pixels can also be seen in the phase spectrum (cf. FIG. 9 (b)) as local pixel phase jumps. Since these local pixel phase jumps occurs randomly or close to weak signal strengths, it can be considered as an effect of noise on the CTF. Just as it is known from intensity deconvolution, the bigger $k_{max}$ is chosen, in order to resolve smaller $d_{min}$, the better the SNR shall be.

The origin of the gain in resolution is a stronger spectral support at high frequencies in the spectrum after deconvolution (cf. FIG. 9(a,b)). The cross section in FIG. 9(c) compares the profiles of spectra before (cf. FIG. 6(a,b)) and after (cf. FIG. 9(a,b)) deconvolution. The same is shown for intensity deconvolution in FIG. 9 (d). The comparison between both plots highlights only the complex deconvolved spectrum in (c) the falloff edge is increased and frequencies above the cutoff are added i.e. the gain in resolution. However, plot (c) of FIG. 9 is not a sufficient proof of super-resolution since already adding a constant frequency could lead to a similar result. The 'real' super-resolution aspect results from the frequency pattern in FIG. 9(a) which exhibit a nicely restored continuous frequency content. The reason for this behavior lies in the phase jumps seen in plot (b) (cf. FIG. 9), which shifts the phase spectrum of it. This shift extends the spectrum to higher frequencies.

Apparently, this mechanism does not hold good for the intensity deconvolution. Moreover, the frequencies related to super-resolution are located at higher frequencies (cf. FIG.

9(d)) and thus making it more sensitive to noise (cf. FIG. 10(d)). Vice versa, due to the shift to lower frequencies, the complex spectrum is less sensitive to noise. Consequently, as long as the image spectrum still contains a clearly pronounced falloff edge (cf. FIG. 6(c,d)) the image is notably improved in resolution and contrast (cf. FIG. 9(c,d)). For the η=300 nm case the fall off edge is almost cut off. Only a 'small' peak is recovered which may be subject to noise and to model mismatch. The model sensitivity is reflected in the correctness of the related p-t-p distance which decreases towards η=300 nm. In the same way, it holds for the decreasing contrast.

The effectiveness of the complex deconvolution is summarized in FIG. 10. First of all, it shows the merged PSF of the resolution-limited system in FIG. 10 (b). Even if intensity deconvolution (cf. FIG. 10 (c)) results in narrower FWHM, the resolution is not improved. On the other hand, complex deconvolution by the experimental CTF succeeds in resolving the individual peaks (cf. FIG. 10(e)). Complex deconvolution by a noise free synthetic CTF: SCTF (cf. FIG. 10 (d)) is capable of resolving them as well. The mismatch of the model with experimental data results, though, in an overestimation of η. In FIG. 10 (d) is appears FWHM tend to be very slim but artifacts cause a broadening and worse contrast as confirmed by FIGS. 8 (b) and (c). Thus, no real image improvement is achieved since the model mismatch causes severe artifacts. Finally, complex deconvolution by the experimental CTF holds the best match on η. However, if the synthetic noise free CTF was adapted in such a way as to avoid effectively artifacts even resolution beyond Eq. (46) could be possible.

In a third, preferred embodiment, the disclosed method teaches how the how a general theory is established for complex deconvolution that excludes noise by truncating high frequencies without any further assumptions on noise source. The theoretical consideration is based on the assumption that each sub-Rayleigh object acts as a spherical wave emitter accordingly to Huygens' principle. In the classical imaging formalism for incoherent light, those emitters do not interact and are simply imaged as an ensemble of PSF. Consequently, the intensity deconvolution mechanism works well as long as the interference interaction between the scatterers is small e.g. for η=600 nm. Beyond that limitation, intensity deconvolution results in an incorrect evaluation of the scatterers' positions and their contrasts vanish.

Nonetheless, within the original bandpass of the imaging system, there does exist information that originates from the objects' scattered light and lies outside the bandpass: the phase discontinuities. Coherent imaging bears the capability of recovering such intrinsic data derived from interferences in order to achieve super-resolution. The disclosed invention demonstrates experimentally the effectiveness of complex deconvolution for the developed test target of known structure. The results (FIG. 10-11) indicate that using complex deconvolution with experimental CTF can increase resolution whilst localizing the objects within ±25 nm. Moreover, image improvement for complex deconvolution by synthetic SCTF is in principle possible as well, however, a very exact adaptation of the model to the experimental data is crucial. The phase fitted CTF allows to characterize the imaging system and demonstrates the noise's influence during the complex deconvolution.

Accessing the object's scattered complex field—containing the information coded in the phase—and deconvolving it with the reconstructed complex transfer function (CTF) is claimed to be at the basis of the disclosed method. It is taught how the concept of "Synthetic Coherent Transfer Function" (SCTF), based on Debye scalar or Vector model includes experimental parameters of MO and how the experimental Amplitude Point Spread Functions (APSF) are used for the SCTF determination. It is also taught how to derive APSF from the measurement of the complex field scattered by a nanohole in a metallic film.

Finally a strategy to improve the efficiency of the complex deconvolution method based on a fine tuning of the Synthetic Coherent Transfer Function SCTF is disclosed, which is based on the definition of well defined criteria:
1) Criteria based on one side on the quality of the fit of the physical model for CTF to the experimental CTF measured with the instrument
2) On the a-posteriory evaluation of the quality of the deconvolved image which is the base of an iterative technique consisting in adjusting the SCTF parameters on the basis of criteria about the physical reality of the deconvolved image. In particular, the so-called "Phase flattening" postulates the constancy of the phase of the deconvolved phase image, outside the specimen image.

The two following concepts are disclosed:
1) A criterion to fit the synthetic $CTF_{syn}$ to the experimental $CTF_{exp}$ with the following properties:
   (a) A noise independent CTF especially crucial for high frequencies.
   (b) Imaging model must be used to design the CTF and can be tested for their validity and limitations in this way.
   (d) Optionally, this method relies on experimental APSF data.
2) A second criterion called 'phase flattening' by $CTF_{syn}$ with the following properties:
   (a) This approach offers great conveniences since it is based on a physical model without the need to experimentally access APSF measurements.
   (b) It provides a noise free CTF, too.
   (c) It consists in designing the $CTF_{syn}$ orientated towards the deconvolution output.

In a fourth, preferred embodiment, the disclosed method teaches the how the limit of resolution can be extended to a limit of λ/6 or smaller. The destructive interference between waves emitted by the point-scatterers results in phase singularities. Such discontinuities occur at spatial positions where the spherical waves emitted from each hole are out of phase. As reported earlier the orientation angle θ of those lines of singularities varies systematically with the pitch i of the point-scatters, as depicted in FIG. 1, where FIG. 3 shows schematically its phase and FIG. 1 the point-scatterers' experimental realization.

A total of four destructive interferences are possible for the two pairs of rings. The characteristic spacing s between two out of phase circles can be calculated by $$s = \frac{\Delta\Phi}{k_{max}} = \frac{\pi}{(2\pi/\lambda)NA_{MO}} = \frac{\lambda}{2NA_{MO}}, \quad (49)$$

with the maximal spatial frequency $k_{max}$ allowed by NA. Following, our theoretical description is based on the experimental situation of an arbitrary phase difference Δφ. In the event of an offset phase difference Δφ, for instance through a longitudinal displacement Δz, a correction Δs=λΔφ/(2π) is introduced in $r_2$=r±Δs+s ('+', advanced phase; '−', retarded phase) relative to $r_1$=r. Hence, $$s\pm = s \pm \Delta s = s(1 \pm NA\Delta\phi/\pi), \quad (50)$$

the effective spacing can be contracted or dilated. Combining the geometrical relations and solving it for η results in $$\eta(\theta_+, r, s_+) \stackrel{!}{=} \eta(\theta_-, r, s_-), \quad (51)$$

This equation must yield individually to pairs of asymmetric singularities (cf. left and right side in FIG. 3)

$$\eta(\theta_\pm, r, s_\pm) = \{2r^2 + 2rs_\pm + s_\pm^2 - [4r^2(r+s_\pm)^2 - s_\pm^2(2r+s_\pm)^2 \cot^2\theta_\pm]^{1/2}\}^{1/2}. \quad (52)$$

if $s_\pm \neq s$. In that manner, a phase difference $\Delta\phi$ breaks symmetry in which a de-phasing is coded. The phase difference may offer advantages concerning the lateral as well as longitudinal resolution, as the following sections discuss.

A longitudinal displacement $\Delta z$ of one of the point-scatterers results in an offset phase difference $$\Delta\phi_{long} = \frac{2\pi n_m \Delta z}{\lambda}, \quad (53)$$

giving rise to $s\pm$ according to. We can predict the expected angular dependence for a given distance η

$$\theta_\pm[\eta, r, s_\pm +] = \arctan(s_\pm(2r+s_\pm)\{(s_\pm^2 - \eta^2)[\eta^2 - (2r+s_\pm)^2]\}^{-1/2}), \quad (54)$$

which is illustrated in FIG. 13.

For the given distance η, pairs of singularities symmetrically oriented if $\Delta z=0$. An asymmetry is introduced by increasing $\Delta z$, so that one pair of singularities' θ is decreased while the other pair is increased. That dynamic holds up to a point of 0.32λ, at which point θ+ reaches π/2 and cannot be further, increased. Therefore, plot (a) in FIG. 13 suggest an unique dynamic range of maximal 0.32λ as upper limit. However, it also suggests that the minimal distinguishable axial displacement is only SNR limited by the read-out accuracy of the phase singularities' orientation. In FIG. 13, a statistical reading precision of σ=4° 1 is indicated, and the axial resolution limit reads 0.05λ.

Typically, that can be related with an axial precision of $\Delta z \approx 25$ nm at λ=532 nm, η=400 nm and NA≈1. Through several ring measurements one can obtain such a statistical accuracy or better. On the other side, practical consideration, like discretization concerns or asymmetric aberrations, might limit the longitudinal resolution. Given that θ can maximally reach π/2, Eq. (52) converges to $$\lim_{\theta \to \pi/2} \eta = s_\pm, \quad (55)$$

$\theta \to \pi/2$ stating the minimal deducible distance η is limited by $s\pm$. Thus, a new lateral resolution $d\pm\min$ limit given for the maximal angle of θ is $$d_{min}^\pm = \min[\eta] = \min\left[\frac{\lambda}{2}\left(\frac{1}{NA_{MO}} \pm \frac{\Delta\phi}{\pi}\right)\right]. \quad (56)$$

This equation states a modified limit of resolution based on an adapted coherent resolution criterion. It results in resolvable distances that are in principal only SNR limited, as shown in FIG. 13(*b*), if $\Delta\phi$ is arbitrarily tunable. That implies, two point-scatterers at distances well beneath Abbe's resolution limit result in asymmetric pairs of phase singularities, possibly only three singularities if θmax exceeds π/2. In that situation, criterions to avoid possible ambiguities would become necessary:

1. Broadening effects of phase singularities.
2. Phase scanning methods, as discussed in experimental section.

Eventually, the upper theoretical consideration is based upon the assumption that $\Delta\phi$ itself can be created without any limitation on it's lateral extension. If, however, $\Delta\phi$ is created by tilt illumination as suggested by insert of FIG. 12, the de-phasing is a function of η as further discussed in the following section. For the proof of principle, we use a test target consisting of a thin opaque aluminum film (thickness=100 nm) on a conventional coverslip. Nano-metric apertures (nominal=80 nm) are drilled with focused ion beam (FIB) milling in the coating and are placed at very close pitches η. The fabricated pitch is controlled and measured by scanning electron microscopy (SEM), as shown in FIG. 3.

The differently pitched double hole series [cf. FIG. 1] serve as experimental test targets. The test targets are put in transmission DHM setup depicted in FIG. 12. The light source is a YAG laser at λ=532 nm. The used microscope objective is a Zeiss x63 NAMO=0.93 in air (refractive index nm=1) in combination with a relay magnification to reach a lateral sampling of δx=80 nm. Since a small controlled longitudinal displacement $\Delta z$ of the holes is difficult to realize experimentally, we present a proof of principle of lateral phase difference resolution. The phase difference $\Delta\phi$ is created by a wedge prism and put in imaging condition as shown in FIG. 12. The incident angle α can maximally reach the steepest angle allowed by the condenser lens's NAex=0.25 used to excite the point-scatters. Hence, the phase difference $$\Delta\phi_{lat} = \frac{2\pi n_m \eta \sin\alpha}{\lambda} \cos\beta, \quad (57)$$

λ where α=arcsin(NAex/nm) and β is the rotation angle of the wedge prism with which the $\Delta\phi$ can be tuned.

The maximal singularity's asymmetry is reached at β=[0, π], whereas β=[π/2, 3π/2] hold for symmetric singularity configuration. For the optimal asymmetry orientation β=0, the asymmetric effective spacing, $$s_\pm = \frac{\lambda}{2NA_{MO}} \pm \eta NA_{ex}\cos\beta, \quad (58)$$

can be seen to become double NA limited. Furthermore, the maximal condition for resolution states $s\pm=\eta$. Thus, the minimum yields for the resolution limit using tilt illumination $$d_{min}^+ = \min[\eta] = \frac{\lambda}{2NA_{MO}[1 + NA_{cond}]}. \quad (59)$$

As a consequence, the maximal resolution power can be estimated to reach maximally $$\lim_{NA_{cond} \to max} \lim_{NA_{MO} \to max} d_{min}^+ \approx \frac{\lambda}{7.2}, \quad (60)$$

assuming a maximal possible immersion NA of about 1.46. With the shortest optical wavelength λ=400 nm, the lateral limit with tilt illumination lead to d+min≈60 nm.

In FIGS. 14(a,c,e) and (g,i,k) the phase singularities' behavior for tuning β is demonstrated for different pitches η. It can be seen that singularities' orientations can be indeed tuned by introducing a phase difference Δφ that is controlled by the wedge prism's orientation β, as defined in FIG. 12. The phase singularities are symmetrically oriented for a perpendicular holes' excitation (β=π/2), shown in FIG. 14(c) for η=400 nm and FIG. 14(i) for η=300 nm. Both images show the phase map of distances η well beneath the Rayleigh resolution limit of $d_{Rayleigh} \approx 470$ nm, while the pitch of image FIG. 14(c) is about Abbe's resolution limit of $d_{Abbe} \approx 300$ nm. Thus, four singularities are observable in FIG. 14(c), while they seem to merge to two min broadened singularities in FIG. 14(i). By detuning β, Δφ≠40 can be controlled and the phase singularities become asymmetrically oriented. In the case of η=400 nm, the two singularities merge on one side and become more spare on the other side. This results in a total of three singularities in FIG. 14(a) and FIG. 14(e). In the case of η=300 nm, an originally merged singularity opens up again and consequently results in three singularities in FIGS. 14(g) and (k).

The importance of the described behavior can be well seen in their spectra, depicted in FIGS. 14(b,d,f) and FIGS. 14(h,j,l). The Fourier-transform leads to a mixing up of modulus and phase of the complex image. Thus, the real space phase singularities are seen as minimum transmittances in the amplitude k-space (wavenumber).

Firstly, FIG. 14(d) and FIG. 14(j) visualize the importance of $d_{Rayleigh}$ and $d_{Abbe}$. At Abbe's resolution limit of η=300 nm in FIG. 4(j), the minimal transmittance reaches the bandpass's edge which corresponds to a wavenumber of $k \approx 2\pi/\lambda$.

The transmittances minima shift asymmetrically to different frequencies as β is detuned, yielding for Δφ≠40. As observed, their positions shift on one spectral side to lower and on the other spectral side to higher wavenumbers $k_x$. In this manner, higher frequencies than originally allowed by the bandpass can be accessed, eventually giving rise to resolution beneath Abbe's resolution limit. The maximal shift of the transmittances minima in FIG. 4 corresponds to the largest angle θ of the phase singularities.

The comparisons of real-space with its corresponding spectra reveal that θ can be more precisely assessed in k-space. For instance, one can see that the three singularities in phase image FIG. 14(a) corresponds actually to four singularities in k-space. In real space, this behavior is barely observable due to broadenings effects.

For the following analysis, 0 is directly measured from the spectra and summarized in FIG. 15. It compares the experimental results directly to the theoretical behavior predicted. FIG. 15(a) represents the case where β≠0 leads to a splitting up of θ±. However, their orientation never exceeds the maximal orientation of θ=π/2. In contrary, FIG. 15(b) reaches the saturation point only after little detuning of β and features only three singularities on most of its β-range. Eventually, both theoretical plots predict correctly the experimentally observed behavior, within an angular precision of about 5%.

As demonstrated, any longitudinal displacement Δz yields for coherent imaging the capacity of increased spatial resolution. Similarly, a laterally introduced Δφ result in asymmetric singularities. In the investigated case of Δφ≠0, the limit of resolution is demonstrated to hold the potential to be tremendously extended.

Based on fundamental geometry and physical considerations, a theory for a general theory of resolution of coherent imaging systems is derived. It gives rise to an alternative approach of explaining image resolution improvements by angular scanning methods.

The correctness of the derived theory is confirmed by the accordance of experimental data with the derived theory. Ultimately, it supports the hypothesis that the resolution limit can be extended by this technique up λ/7.2, as theoretically concluded.

The presented analysis is based on linear de-phasing Δφ as summarized in FIG. 16(b). It is a further development of the symmetric concept depicted in FIG. 16(a). Based on these ideas, FIG. 6(c) indicates how to overcome wavelength or tilting angle limitations. In scanning techniques like STED or PALM-STORM first-order Bessel beams with line-singularities are used to create modulation patterns, either based on phase plates or spatial light modulation.16 Similarly, a 'doughnut' mode beam intrinsically offers a steep π-step. Thus, it could be possible to use a extremely steep phase singularity [cf. FIG. 16(c)] for DHM with resolution well beyond λ/7.2, giving rise to a new field of phase imaging application in biological imaging.

In a fifth, preferred embodiment, the disclosed method teaches how the general imaging aspects of the proposed method and its impact on phase's signal are evaluated. Moreover, the extraction of a scattered object field is practically demonstrated to result in optical sectioning.

First, the experimental APSF and CTF are depicted for experimental data in FIG. 19 and FIG. 20. The general impact of complex deconvolution on the coherent imaging inversion under non-design conditions is discussed. For this purpose, experimental images of non-absorbing mono-dispersed polystyrene microspheres (nsph=1.59, ≈5.8 μm) in water (nm,HO=1.33) are recorded at a tilt angle of θ=15°, shown in FIG. 21(a) for raw data and in FIG. 21(b) after deconvolution.

If complex deconvolution is successful, then a number of improvements in the complex field should be noted, accordingly indicated in FIG. 21 by regions of interests (ROI):

Background Extinction:

The transparent sample images are recorded with the incident light $o^{(i)}$ in direction of $k_0$. According FIG. 18, a DC value is added to the APSF to compensate for o(i) well seen by reduced back-ground haze in FIG. 21 ROI-1 in amplitude. Similarly, the removed background results in full 2π-dynamical range as shown in FIG. 21 ROI-3. Finally, the object ROI-2 in FIG. 21 includes improved contrast since the objects' edges are sharpened by the complex deconvolution.

Diffraction Pattern Suppression:

A second motivation consists in correcting the diffraction pattern of the MO's APSF. This correction is in particular required for high-NA imaging systems since the APSF diffraction pattern may result in incorrect tomographic reconstruction in the near resolution limit range. The diffraction pattern can be observed to be well suppressed by comparing ROI-1 in FIG. 21. As a result, the diffraction pattern of the refractive index mismatched sphere becomes apparent in ROI-2 of FIG. 21.

Complex Aberration Correction:

Aberrations are intrinsic to MO, especially for high-NA MO. Additionally, experimental MO non-design conditions may introduce symmetric aberrations. Those conditions include non-design refraction index of ni, mismatch of ni and nm, defocus of object in nm, and non-design coverslip thickness or refraction index. Asymmetric aberrations are introduced by the sample rotation. The asymmetric aberration can be observed as the diffraction pattern deformation in FIG. 21 ROI-1 and ROI-3 of the raw images. As a consequence, the raw object in FIG. 21 ROI-2 is deformed. However, in ROI-1 of FIG. 21 the pattern is removed after diffraction and the phase oscillation is equally spaced after deconvolution as shown in FIG. 21 ROI-3. Eventually, the object can be deformation free reconstructed in FIG. 21 ROI-3.

Note, that even with an accurate APSF and an effective deconvolution algorithm, deconvolved images can suffer from a variety of defects and artifacts described in detail in reference.

The source of most artifacts is due to noise amplification. The suggested 3D deconvolution of complex fields has the capacity to tune between complex and phase deconvolution. Thus, noise amplification can be excluded for $\tau=1$ while the phase part still acts for image correction according to the previous section. The phase deconvolution acts effectively as a subtraction of the diffraction pattern in phase. Strictly speaking, the recorded phase is not the phase difference between object and reference beam, but also includes the MO's diffraction due to frequency cutoff. The coherent system is seen to exhibit rather pronounced coherent imaging edges known as 'ringing'. For phase observation applications of biological samples, the diffraction influence in phase may be of great importance for the phase's signal interpretation.

Consequently, we investigate the complex deconvolution's influence on biological samples' phase signal. The samples are human red blood cells (RBC) that are fixed by ethanol (nEtOH=1.3 at $\lambda$=590 nm). The RBCs are suspended in HEPA buffer (nm,HEPA=1.334 at $\lambda$=682 nm) and recorded with the experimental setup. A comparison between the raw phase images and the phase deconvolved images is shown for two RBCs cells in FIG. 22($a$) and FIG. 22($c$).

The influence of the phase deconvolution can be seen directly by comparing these topographic images. Based on their shape the RBCs are classified in different stages. The raw images in FIG. 22($a$) resemble a trophozoite stage while its phase deconvolved image reveals a ring structure. Similarly, the processed RBC in FIG. 22($c$) reveals a trophozoite stage. A more detailed comparison is given by its central height profiles in FIG. 22($b$,$d$), calculated by assuming a constant refractive index of nRBC=1.39. It shows that the deconvolved phase profile follows basically the raw trend. However, similar to coherent imaging ringing, edges are less prone of oscillations after phase deconvolution. Thus the impact of the complex deconvolution is to de-blur the phase signal.

From the intensity deconvolution point of view, pseudo 3D microscopy can be achieved by reduction of out-of-focus haze, which means that the spread of objects in the z-direction is reduced. Recently, this potential has also been demonstrated for digitally refocused 3D fields. Optical sectioning effects are therefore intrinsic to 3D complex deconvolution if $\tau\ll 1$.

From the intensity deconvolution point of view, pseudo 3D microscopy can be achieved by reduction of out-of-focus haze, which means that the spread of objects in the z-direction is reduced. Recently, this potential has also been demonstrated for digitally refocused 3D fields. Optical sectioning effects are therefore intrinsic to 3D complex deconvolution if $\tau\ll 1$.

The raw 3D field |U| in FIG. 23($a$) shows the object spread along the axial direction. As expected, the reconstruction features no axial confinement and the RBCs cannot be recognized.

On the other side, the scattered object field $|o^{(s)}|$ after truncated inverse filtering is depicted in FIG. 23($b$). It shows that background field and out-of-focus haze are successfully removed. The RBC's edges can be identified as strong scattering objects and the scattered field can be recognized to match in size and positions with anticipated RBC values. Although, the image quality is affected by artifacts in axial elongation, its axial dimensions still match well. However, the refractive index mismatched cell membrane (nlipid>1.4) and the HEPA mounting medium (nm,HEPA=1.334 at $\lambda$=682 nm), results in strong scattering well visible in the xz sections.

Eventually, the fields related to refraction can be reconstructed in FIG. 23($c$). In particular, the refraction due to the strong scattered field around the RBCs allows a good three-dimensional localization of the RBCs' edges. Moreover, the higher refraction index due to its hemoglobin content is well visible in the xz sections. Note, that these data are reconstructed from only one hologram for a single incident angle k0 and therefore missing angles affect the reconstruction as seen by the lateral artifacts. However, if the 3D inverse filtering technique is combined with a multi-angle acquisition, it holds the potential of quantitate 3D refraction index reconstruction.

To summarize, the complex deconvolution method combined with tilt illumination can be considered to give far better resolution results for coherent optical systems as normally achieved for incoherent optical system. Above all, its resolving power is rather limited compared to complex deconvolution that features almost double the lateral resolution. The post-processing of complex deconvolution does not need any modification of the setup and is best suitable for methods providing complex fields such as DHM. Only the image's phase holds the ability to recover the CTF, which includes interferences originated from higher spatial frequencies. The limit of resolution with coherent illumination can be extended by a factor of 600%.

The presented theory, connects three-dimensional coherent image formation and diffraction theory, and results in a model for object scattering reconstruction by inverse filtering. This approach is experimentally complimented by the ability to characterize the DHM setup by the pure APSF thanks to the use of a complex point source. The physical importance of the realistic 3D CTF is demonstrated and applied to experimental images for the effective correction of background illumination, diffraction pattern, aberrations and non-ideal experimental imaging conditions. Moreover, the regularization of the three-dimensional deconvolution of complex fields is shown to yield for the phase as well as the complex domain. Depending on the threshold, phase de-blurring or optical sectioning is demonstrated with RBC measurements. Most essentially, the importance of complex deconvolution for correct phase reconstruction is evaluated and the capability of scattered field extraction is experimentally presented.

In conclusion, the demonstrated technique yields the potential to reconstruct object scattering functions under realistic high-NA imaging conditions that plays a key role in high-resolution diffraction tomography based on sample or illumination rotation.

CITED REFERENCES

Gerchberg, R. & Saxton, W. Practical algorithm for the determination of phase from image and diffraction plane pictures. *Optik* 35, 237-246 (1972).

Fienup, J. R. Reconstruction of an Object from Modulus of Its Fourier-Transform. *Optics Letters* 3, 27-29 (1978).

Yang, G. & Gu, B. On the amplitude-phase retrieval problem in the optical system. *Acta Phys. Sinica* 30, 410-413 (1981).

Teague, M. R. Image-Formation in Terms of the Transport-Equation. *Journal of the Optical Society of America a-Optics Image Science and Vision* 2, 2019-2026 (1985).

Gureyev, T. E., Roberts, A. & Nugent, K. A. Phase Retrieval with the Transport-of-Intensity Equation—Matrix Solution with Use of Zernike Polynomials. *Journal of the Optical Society of America a-Optics Image Science and Vision* 12, 1932-1941 (1995).

E. D. Barone-Nugent, A. Barty and K. A. Nugent, "Quantitative phase-amplitude microscopy I: optical microscopy," *Journal of Microscopy* 206 (3), 194-203 (2002).

Popescu, G. in Methods in Nano Cell Biology 87-+(Elsevier Academic Press Inc, San Diego, 2008).

P. Bon, G. Maucort, B. Wattellier and S. Monneret, "Quadriwave lateral shearing interferometry for quantitative phase microscopy of living cells," *Optics Express* 17 (15), 13080-13094 (2009).

C. Maurer, S. Bernet and M. Ritsch-Marte, "Refining common path interferometry with a spiral phase Fourier filter," *Journal of Optics A: Pure and Applied Optics* 11 (9), 094023 (2009).

E. Cuche, P. Marquet, and C. Depeursinge, "Simultaneous amplitude-contrast and quantitative phase-contrast microscopy by numerical reconstruction of fresnel off-axis holograms," Appl. Opt. 38, 6994-7001 (1999).

Marian, F. Charriere, T. Colomb, F. Montfort, J. Kihn, P. Marquet, and C. Depeursinge, "On the complex three-dimensional amplitude point spread function of lenses and microscope objectives: theoretical aspects, simulations and measurements by digital holography," J. Microsc. 225, 156-169 (2007).

The invention claimed is:

1. A method for imaging a microscopic object with improved resolution comprising:
    measuring with an interferometer or microscope a complex wavefield scattered by the microscopic object, the complex wavefield being represented by phase and amplitude or by real and imaginary parts; and
    computing an image of the microscopic object with a resolution better than given by the Abbe diffraction limit, including deconvolving the complex wavefield scattered by the microscopic object with a complex coherent transfer function (CTF) applied to the complex wavefield.

2. A method according to claim 1, wherein the image of the complex wavefield is given by a representation of the 3D distribution of complex numbers representing the physical field emitted by the microscopic object in the 3D space surrounding the microscopic object.

3. A method according to claim 2, wherein the complex wavefield emitted by the microscopic object is an electromagnetic field scattered by the microscopic object irradiated by a primary field.

4. A method according to claim 1, wherein the complex wavefield is obtained by reconstructing a wavefield in 3D by computing the propagation of a wavefront measured on one or a plurality of 2D surfaces by said measuring interferometer or microscope.

5. A method according to claim 4, wherein the wavefront is reconstructed from measurements taken by a wavefront sensor of the interferometer or microscope.

6. A method according to claim 5, wherein the wavefront sensor is selected from a group consisting of a Digital Holographic Microscope, a Quantitative Phase Microscope configured to provide amplitude and phase information, a Shack-Hartmann wavefront analyzer, a multi-level lateral shearing interferometer, a common-path interferometer, and interferometers that convert stacks of intensity images into a quantitative phase image.

7. A method according to claim 4, wherein the wavefront is reconstructed by Digital Holographic microscopy.

8. A method according to claim 4, wherein the wavefront is reconstructed according to a method based on quantitative phase microscopy configured to deliver a comprehensive measure of the complex wavefield scattered by the microscopic object, including: defocused imaging, differential interference contrast (DIC) microscopy, Shack-Hartmann wavefront analysis, multi-level lateral shearing interferometry or common-path interferometry, or conversion of stacks of intensity images (transport intensity techniques: TIT) into a quantitative phase image.

9. A method according to claim 1, wherein said complex CTF applied to the complex wavefield is based on detecting phase singularities in a phase image and computing a distance of sub-Rayleigh distanced objects from an angle between lines forming a locus of said phase singularities.

10. A method according to claim 1, wherein the complex CTF is characterized by a frequency response of the interferometer or microscope, and wherein deconvolving the complex wavefield scattered by the microscopic object comprises dividing said complex wavefield by the complex CTF.

11. A method according to claim 10, wherein the complex CTF is a complex synthetic coherent transfer function (SCTF).

12. A method according to claim 11, wherein the complex synthetic coherence transfer function (SCTF) is tuned according to a set of criteria comprising the quality of the fit to an experimental coherence transfer function, and an a-posteriori evaluation of a quality of the image computed by deconvolving the complex wavefield scattered by the microscopic object.

13. A method according to claim 12, wherein said a-posteriori evaluation is based on an iterative technique comprising adjusting parameters of the complex SCTF on the basis of criteria of a physical reality of the deconvolved complex field image, said physical reality including a constancy of the phase of the deconvolved phase image outside the microscopic object image.

14. A method according to claim 1, wherein coherent illumination is applied to the microscopic object.

15. A method according to claim 1, wherein 3D deconvolution of complex wavefields is applied to provide full tomographic imaging.

* * * * *